(12) United States Patent
Boris et al.

(10) Patent No.: US 12,719,326 B2
(45) Date of Patent: Aug. 25, 2026

(54) STATOR FOR AN ELECTRICAL MACHINE AND ELECTRICAL MACHINE

(71) Applicant: Valeo eAutomotive Germany GmbH, Erlangen (DE)

(72) Inventors: Dotz Boris, Bad Neustadt a.d.Saale (DE); Christian Finger-Albert, Bad Neustadt a.d.Saale (DE)

(73) Assignee: Valeo eAutomotive Germany GmbH, Erlangen (DE)

( * ) Notice: Subject to any disclaimer, the term of this patent is extended or adjusted under 35 U.S.C. 154(b) by 211 days.

(21) Appl. No.: 18/694,535

(22) PCT Filed: Sep. 15, 2022

(86) PCT No.: PCT/EP2022/075693
§ 371 (c)(1),
(2) Date: Mar. 22, 2024

(87) PCT Pub. No.: WO2023/046570
PCT Pub. Date: Mar. 30, 2023

(65) Prior Publication Data

US 2025/0007346 A1 Jan. 2, 2025

(30) Foreign Application Priority Data

Sep. 22, 2021 (EP) ..................................... 21198319

(51) Int. Cl.
*H02K 3/28* (2006.01)

(52) U.S. Cl.
CPC ..................................... *H02K 3/28* (2013.01)

(58) Field of Classification Search
CPC .. H02K 3/00; H02K 3/04; H02K 3/28; H02K 3/12; H02K 1/16

(Continued)

(56) References Cited

U.S. PATENT DOCUMENTS 6,049,154 A * 4/2000 Asao ........................ H02K 3/12 29/256
2003/0102761 A1* 6/2003 Wada ................. H02K 15/0421 310/201

(Continued)

FOREIGN PATENT DOCUMENTS

CN 110611387 A * 12/2019 ............... H02K 3/28
CN 112436618 A * 3/2021 ............. H02K 1/165

(Continued)

OTHER PUBLICATIONS

Machine Translation of CN 112436618 A (Year: 2021).*

(Continued)

*Primary Examiner* — Alexander A Singh
*Assistant Examiner* — Charlie Frank Mann, Jr.
(74) *Attorney, Agent, or Firm* — Oblon, McClelland, Maier & Neustadt, L.L.P.

(57) ABSTRACT

A stator for an electrical machine includes a stator core with multiple circumferentially distributed grooves and two opposing axial end sides. A stator winding comprises multiple shaped conductors, each having a first leg, a second leg, and a head portion that electrically connects the legs at one end side. The leg portions extend through different grooves and are spaced apart by a defined groove increment. The head portion includes an inner segment adjoining the first leg and an outer segment adjoining the second leg, with the outer segment positioned radially outward of the inner segment. For different conductors, the groove spacing increment varies: in a first and second conductor it equals S, in a third it is at least S+1, and in a fourth it is at most S−1, where S is a natural number.

20 Claims, 16 Drawing Sheets

(58) Field of Classification Search
USPC .................................................. 310/201, 208
See application file for complete search history.

(56) References Cited

U.S. PATENT DOCUMENTS

2004/0164637 A1* 8/2004 Seguchi .................. H02K 3/28
310/201
2008/0093948 A1* 4/2008 Naganawa ......... H02K 15/0431
310/203
2012/0200191 A1* 8/2012 Baba ........................ H02K 3/04
310/201

FOREIGN PATENT DOCUMENTS

DE 10 2014 105 428 A1 10/2014
WO WO-2020162763 A1 * 8/2020 ............... H02K 3/14

OTHER PUBLICATIONS

Text Version of WO 2020162763 A1 (Year: 2020).*
Machine Translation of CN 110611387 A (Year: 2019).*
International Search Report Issued Jan. 3, 2023, in PCT/EP2022/075693, filed on Sep. 15, 2022, 2 pages.

* cited by examiner

STATOR FOR AN ELECTRICAL MACHINE AND ELECTRICAL MACHINE

SUMMARY OF THE INVENTION

Known from DE 11 2019 004 037 T5 is a stator for an electrical machine, comprising a stator body which supports a plurality of windings. The stator body comprises a plurality of slots. A conductor of the winding forms end windings which have bends with a first winding increment, a second winding increment and a third winding increment. The second winding increment is one greater than the first winding increment. The third winding increment is one smaller than the first winding increment.

In stators with a stator winding made of shaped conductors, the head portions thereof having different increments, these head portions must be mutually disposed in a suitable manner. For example, a small axial winding overhang is desired on the end side where the head portions are located. Similarly, the disposal of the shaped conductors in the stator core should be simple in terms of production.

SUMMARY OF THE INVENTION

The invention is based on the object to provide an improved possibility for disposing shaped conductors of a stator winding with different increments.

In a stator of the type mentioned above this object is achieved according to the invention in that the head portion furthermore has an offset portion which connects the inner portion to the outer portion and has a greater radial extent than the inner portion and the outer portion, and that the outer portion of the head portion of the third shaped conductor runs at least partially radially further outward than the outer portions of the head portions of the first, the second and the fourth shaped conductor.

The stator according to the invention for an electrical machine has a stator core. A multiplicity of grooves are formed in the stator core. The grooves are distributed along a circumferential direction. The stator core has two end sides. The end sides are mutually opposite in an axial direction. The stator furthermore has a stator winding. The stator winding has a multiplicity of shaped conductors. The shaped conductors have in each case one first leg portion, one second leg portion and one head portion. The head portion connects the leg portions in an electrically conductive manner on one of the end sides. The leg portions of a respective shaped conductor extend through different grooves. The leg portions of a respective shaped conductor are spaced apart from one another by an increment of a number of grooves. The head portion has an inner portion. The inner portion extends in the circumferential direction. The inner portion adjoins the first leg portion. The head portion has an outer portion. The outer portion extends in the circumferential direction. The outer portion adjoins the second leg portion. The outer portion is disposed radially further outward than the inner portion. The increment in a first and a second of the shaped conductors is S. S is a natural number. In a third of the shaped conductors, the increment is at least one greater than S. In a fourth of the shaped conductors, the increment is at least one smaller than S. The head portion furthermore has an offset portion. The offset portion connects the inner portion to the outer portion. The offset portion has a greater radial extent than the inner portion and the outer portion. The outer portion of the head portion of the third shaped conductor runs at least partially radially further outward than the outer portions of the head portions of the first, the second and the fourth shaped conductor.

The invention is based on the concept of routing the outer portion of the third shaped conductor, i.e. the one with the large increment, radially outside along the outer portions of the first, the second and the fourth shaped conductor, so as to utilize radial installation space. The required offset in the radial direction herein is formed by the offset portion of a respective head portion. A small winding overhang can be achieved on the first end side as a result.

The stator core can be formed from a multiplicity of axially layered and/or mutually electrically isolated individual laminations.

The inner portion and/or outer portion of the head portion of a respective shaped conductor preferably extend/extends in the circumferential direction and in the axial direction. The offset portion of the head portion of a respective shaped conductor preferably forms a radial offset between ends of the inner portion and of the outer portion of the respective shaped conductor that face the offset portion.

The offset portion of the head portion of a respective shaped conductor forms in particular a location of the head portion that is axially furthest away from the stator core. At this location, the axial extent of the offset portion is in particular reversed. A transition from the first leg portion to the inner portion and/or a transition from the inner portion to the offset portion and/or a transition from the offset portion to the outer portion and/or a transition from the outer portion to the second leg portion are/is preferably formed with a bending radius that is smaller than any bend radius occurring on the inner portion and/or outer portion.

The shaped conductors on the side facing away from the head portion can in each case also have two connecting portions which adjoin the leg portions and are disposed on the other end side of the stator core. A respective connecting portion can be connected mechanically and in an electrically conductive manner to the connecting portion of another shaped conductor. Preferably, the connecting portions are connected in a materially integral manner, in particular by means of welding. The leg portions and/or the head portion and/or the connecting portions of a respective shaped conductor can be formed in one piece. The shaped conductors are in each case preferably formed from a rod bent multiple times. The shaped conductors can be formed from a metal, preferably copper.

The shaped conductors have in particular rectangular cross sections with two lateral lengths. The two lateral lengths can be identical, but preferably have different lengths. If, for example, the shaped conductors are bent by way of their longer sides, their bending radii are preferably at least as large as the length of the shorter side lengths. If, for example, the shaped conductors are bent by way of their shorter sides, the bending radii are preferably at least three quarters as large as the length of the longer side lengths.

In preferred design embodiment it is provided that the outer portion of the head portion of the fourth shaped conductor runs at least partially radially further outward than the outer portion of the head portion of the first shaped conductor. As a result, the outer portion of the head portion of the fourth shaped conductor, which has the small increment, can be routed past the outer portion of the first shaped conductor with the increment S in a space-saving manner.

Preferably, each groove is radially divided at least into first to fourth layers, which are sequenced in the order of their designation, for receiving one of the leg portions of one of the shaped conductors. The first layer can be the radially inner layer. In a refinement it can be provided that the first leg portion is disposed in the first or the second layer. Alternatively or additionally, it can be provided that the second leg portion is disposed in the third or the fourth layer.

In detail, it can be provided that

- the first leg portion of the first shaped conductor is disposed in the first layer; and/or
- the second leg portion of the first shaped conductor is disposed in the third layer; and/or
- the first leg portion of the second shaped conductor is disposed in the first layer; and/or
- the second leg portion of the second shaped conductor is disposed in the third layer; and/or
- the first leg portion of the third shaped conductor is disposed in the second layer; and/or
- the second leg portion of the third shaped conductor is disposed in the fourth layer; and/or
- the first leg portion of the fourth shaped conductor is disposed in the second layer; and/or
- the second leg portion of the fourth shaped conductor is disposed in the fourth layer.

Expediently, it can be provided that the first leg portions of the first and the third shaped conductor are disposed in the same groove, and the first leg portions of the second and the fourth shaped conductor are disposed in the same groove. It is preferable here for the groove in which the first leg portions of the first and the third shaped conductor are disposed, and the groove in which the first leg portions of the second and the fourth shaped conductor are disposed, are directly adjacent. Alternatively or additionally, it is provided that the second leg portions of the first and the fourth shaped conductor are disposed in the same groove, and the second leg portions of the second and the third shaped conductor are disposed in the same groove. It can be provided herein that the groove in which the second leg portions of the first and the fourth shaped conductor are disposed, and the groove in which the second leg portions of the second and the third shaped conductor are disposed, are directly adjacent.

Moreover, in fifth to eighth of the shaped conductors the increment can be S, wherein the first leg portions of the fifth and the sixth shaped conductor can be disposed in the same groove, and the groove can be adjacent to the groove in which the first leg portions of the first and the third shaped conductor are disposed. The first leg portions of the seventh and the eighth shaped conductor can be disposed in the same groove, and the groove can be adjacent to the groove in which the first leg portions of the second and the fourth shaped conductor are disposed. Preferably, it is provided that the head portions of the first to fourth shaped conductors are disposed between the head portions of the fifth and the sixth shaped conductor and the head portions of the seventh and the eighth shaped conductor.

In a first preferred design embodiment of the stator according to the invention, one or a plurality of the following features may be provided:

The circumferential extent of the offset portions of the fifth to eighth shaped conductors is preferably chosen, in particular as a function of a material thickness of the shaped conductors and/or of their bending radii, to be so minor that the outer portion of the head portion of the seventh shaped conductor axially covers the outer portion of the head portion of the third shaped conductor. As a result of the design embodiment of the fifth to eighth shaped conductors, the end windings are widely spread out. As a result of being spread out, a gap into which the first to fourth shaped conductors can be inserted is created between the fifth and the sixth shaped conductor, on the one hand, and the seventh and the eighth shaped conductor, on the other hand. The gap also permits a joining process of a shaped conductor cage that for manufacturing the stator is introduced with the leg portions ahead into the grooves to be kept simple.

The inner portion of the head portion of the first shaped conductor can extend radially further inward than the inner portion of the head portion of the second shaped conductor and/or than the inner portion of the sixth shaped conductor and/or than the inner portion of the eighth shaped conductor. Alternatively or additionally, the inner portion of the head portion of the first shaped conductor can extend radially inward beyond a radially inner delimitation of the grooves, in particular beyond a radially inner shell face of the stator core.

The outer portion of the head portion of the third shaped conductor can extend outward as far as the outer portion of the head portion of the fifth shaped conductor and/or as the outer portion of the head portion of the seventh shaped conductor. The outer portion of the head portion of the third shaped conductor and/or the outer portion of the head portion of the fifth shaped conductor and/or the outer portion of the head portion of the seventh shaped conductor can extend radially outward beyond a radially outer delimitation of the grooves.

It can be provided that the head portions of the fifth and the seventh shaped conductor and/or the head portions of the sixth and the eighth shaped conductor and/or the head portions of the fifth and the second shaped conductor and/or the head portions of the seventh and the second shaped conductor are identically shaped. The variety of shapes of the shaped conductors can be kept to a minimum as a result.

It can furthermore be provided that

- the first leg portion of the fifth shaped conductor is disposed in the second layer; and/or
- the second leg portion of the fifth shaped conductor is disposed in the fourth layer; and/or
- the first leg portion of the sixth shaped conductor is disposed in the first layer; and/or
- the second leg portion of the sixth shaped conductor is disposed in the third layer; and/or
- the first leg portion of the seventh shaped conductor is disposed in the second layer; and/or
- the second leg portion of the seventh shaped conductor is disposed in the fourth layer; and/or
- the first leg portion of the eighth shaped conductor is disposed in the first layer; and/or
- the second leg portion of the eighth shaped conductor is disposed in the third layer.

Alternatively or additionally, in the first preferred embodiment, it can be provided that the outer portion of the head portion of the second shaped conductor at least partially covers the outer portion of the head portion of the fourth shaped conductor with respect to the end side.

The first preferred embodiment can also be distinguished in that the outer portion of the head portion of the third shaped conductor extends at least partially axially further away from the stator core than the outer portion of the head portion of the fourth shaped conductor and/or than the outer portion of the head portion of the first shaped conductor. Alternatively or additionally, the outer portion of the head portion of the second shaped conductor can at least partially extend axially further away from the stator core than the outer portion of the head portion of the fourth shaped conductor and/or than the outer portion of the head portion of the first shaped conductor. As a result, the space available for the disposal of the first to fourth shaped conductors can be utilized efficiently, and a small winding overhang can be achieved.

Alternatively or additionally, it can be provided that the offset portions of the head portions of the first, the third and the fourth shaped conductor run side by side along an angular region of the circumferential direction that occupies at least half of an angular region of the circumferential direction occupied by the offset portion of the head portion of the first shaped conductor.

In a second preferred design embodiment of the stator according to the invention, one or a plurality of the following features can be provided:

The outer portion of the head portion of the third shaped conductor can run at least in portions radially further outward than the outer portion of the head portion of the fifth shaped conductor and/or than the outer portion of the head portion of the seventh shaped conductor. The radial extent of the end winding toward the inside can be kept small as a result.

The outer portion of the head portion of the second shaped conductor can run at least partially radially further inward than the outer portion of the head portion of the fourth shaped conductor.

Alternatively or additionally, it can be provided that the outer portion of the head portion of the second shaped conductor at least partially covers the outer portion of the head portion of the first shaped conductor with respect to the end side.

In the second design embodiment, the head portions of the first, the second and the sixth shaped conductor can be identically shaped. Alternatively or additionally, the head portions of the fourth and the fifth shaped conductor can be identically shaped.

In a refinement of the stator according to the invention, it can be provided that the first portions of the head portions of the first and the third shaped conductor run radially side by side between the leg portion adjoining them and the offset portion. Alternatively or additionally, the first portions of the head portion of the second and the fourth shaped conductor can run radially side by side between the leg portion adjoining them and the offset portion.

In a preferred design embodiment, the second, the third and the fourth shaped conductor can be disposed radially side by side in a circular sector of the end side of the stator. This enables a particularly low end winding.

In a preferred design embodiment, the shaped conductors form a plurality of strands of the stator winding. The first to fourth shaped conductors herein can belong to the same strand. Preferably, the stator has at least three strands. Each strand herein corresponds to a phase of the stator.

It is furthermore preferable that the shaped conductors for each strand form a first current path and a second current path which is connected in parallel or in series to the first current path, wherein the first to fourth shaped conductors form a shaped conductor assembly in which the third shaped conductor and the fourth shaped conductor are wired in the first current path, and the first shaped conductor and the second shaped conductor are wired in the second current path. In a further refinement, a further corresponding shaped conductor assembly can be provided, in which the third shaped conductor and the fourth shaped conductor are wired in the second current path, and the first shaped conductor and the second shaped conductor are wired in the first current path.

The fifth and the sixth shaped conductor on the one hand, and the seventh and the eighth shaped conductor on the other hand, in particular belong in each case in particular to different strands than the first to fourth shaped conductors.

The object on which the invention is based is furthermore achieved by an electrical machine comprising a stator according to the invention; and a rotor which is rotatably mounted within the stator; wherein the electrical machine is specified to drive a vehicle.

The electrical machine is preferably an, in particular permanently excited, synchronous machine or an asynchronous machine. The vehicle is preferably a battery-electric vehicle (BEV) or a hybrid vehicle.

The object on which the invention is based is furthermore achieved by a vehicle comprising an electrical machine according to the invention.

BRIEF DESCRIPTION OF THE DRAWINGS

Further advantages and details of the present invention are derived from the exemplary embodiments described hereunder and by means of the drawings. The latter are schematic illustrations in which:

FIG. 4 shows a perspective detailed view of the stator in the region of the first to fourth shaped conductor according to the first exemplary embodiment;

FIG. 10 shows a fragment of the winding diagram, shown in FIG. 9, for a strand according to the first exemplary embodiment;

DETAILED DESCRIPTION

Figure 1:
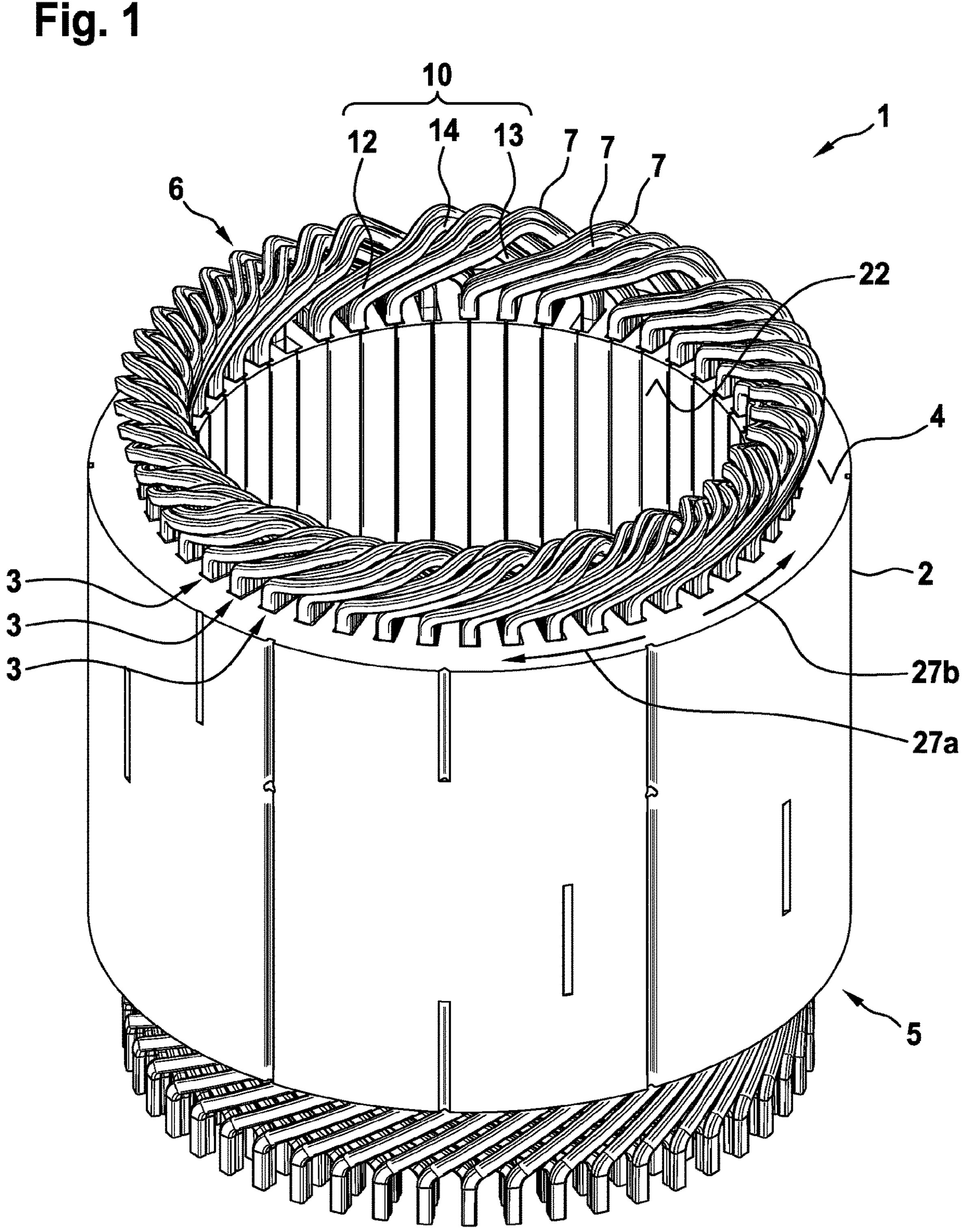
FIG. 1 shows a perspective view of a first exemplary embodiment of the stator according to the invention.

FIG. 1 is a perspective view of a first exemplary embodiment of a stator 1.

The stator 1 has a stator core 2, in which are formed a plurality of grooves 3 that are distributed along a circumferential direction. The stator core 2 has a first end side 4 and, opposite thereto, a second end side 5. The stator core by way of example is formed from a multiplicity of axially layered and mutually insulated individual laminations and can therefore also be referred to as a laminated stator pack. Moreover, the stator 1 has a stator winding 6, which has a multiplicity of shaped conductors 7. Accordingly, the stator winding can also be referred to as a hair pin winding.

Figure 2:
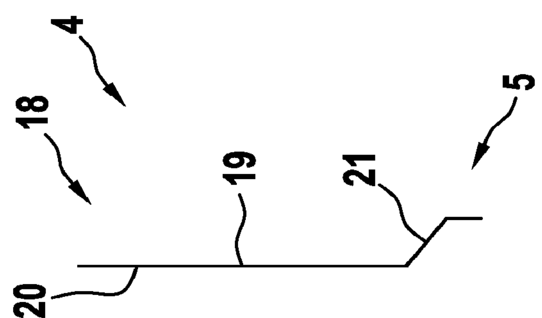
FIG. 2 shows a diagram of the shaped conductors according to the first exemplary embodiment.
Figure 2:
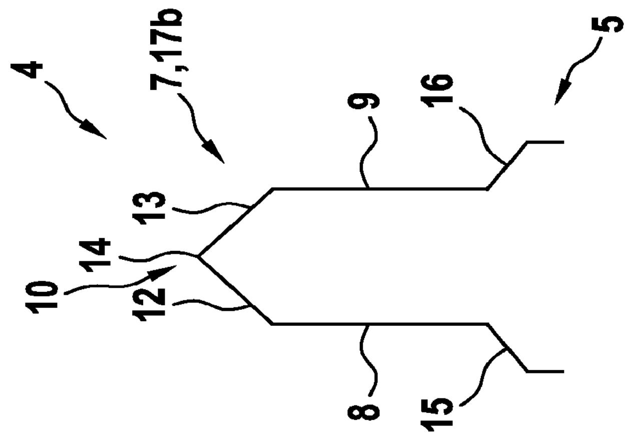
Figure 2:
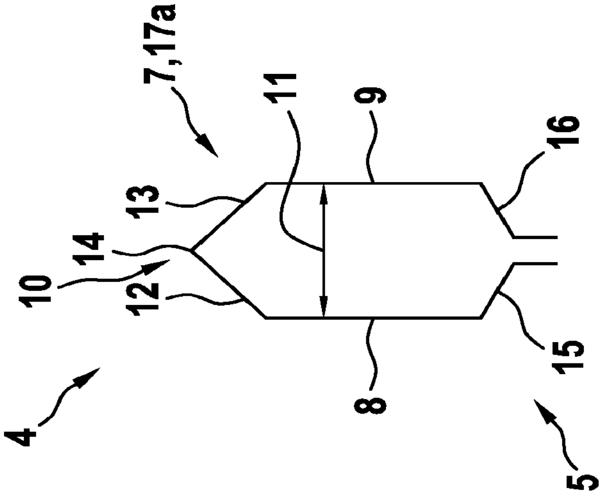

FIG. 2 is a diagram of the shaped conductors 7 according to the first exemplary embodiment.

The shaped conductors 7 have in each case one first leg portion 8, one second leg portion 9 and one head portion 10 which connects the leg portions 8, 9 in an electrically conductive manner on the first end side 4. The leg portions 8, 9 of a respective shaped conductor 7 extend through different grooves 3 (see FIG. 1) and are spaced apart from one another by an increment of a number of grooves. The increment is illustrated by a double arrow 11 in FIG. 2.

The head portion 10 has an inner portion 12 which adjoins the first leg portion 8. Moreover, the head portion 10 has an outer portion 13 which adjoins the second leg portion 9. The head portion 10 furthermore has an offset portion 14 which connects the inner portion 12 to the outer portion 13.

Moreover, the shaped conductor 7 on that side that faces away from the head portion has connecting portions 15, 16 which adjoin the leg portions 8, 9. The connecting portions 15, 16 are disposed on the second end side 5 of the stator core 2. A respective connecting portion 15 is mechanically connected to the connecting portion 16 of another shaped conductor 7 in an electrically conductive and materially integral manner by welding. By way of example, the leg portions 8, 9, the head portion 10 and the connecting portions 15, 16 herein are formed in one piece from a copper rod bent multiple times.

Furthermore shown in FIG. 2 are a first shaped conductor structure 17*a* and a second shaped conductor structure 17*b*, which differ from one another in that the connecting portions 15, 16 point toward one another in the first shaped conductor structure 17*a*, but point away from one another in the shaped conductor structure 17*b*.

FIG. 2 furthermore shows a shaped terminal conductor 18 of the stator winding 6. The shaped terminal conductor 18 has a leg portion 19 which extends through one of the grooves 3 (see FIG. 1), a terminal portion 20 which adjoins said leg portion 19 on the first end side 3, and a connecting portion 21 which adjoins the leg portion 19 on the second end side 5. The connecting portion 21 is connected to a connecting portion 15, 16 of one of the shaped conductors 7. The terminal portion 20 is used to connect the outer ends of the stator winding 6 (see FIG. 1).

Figure 3:
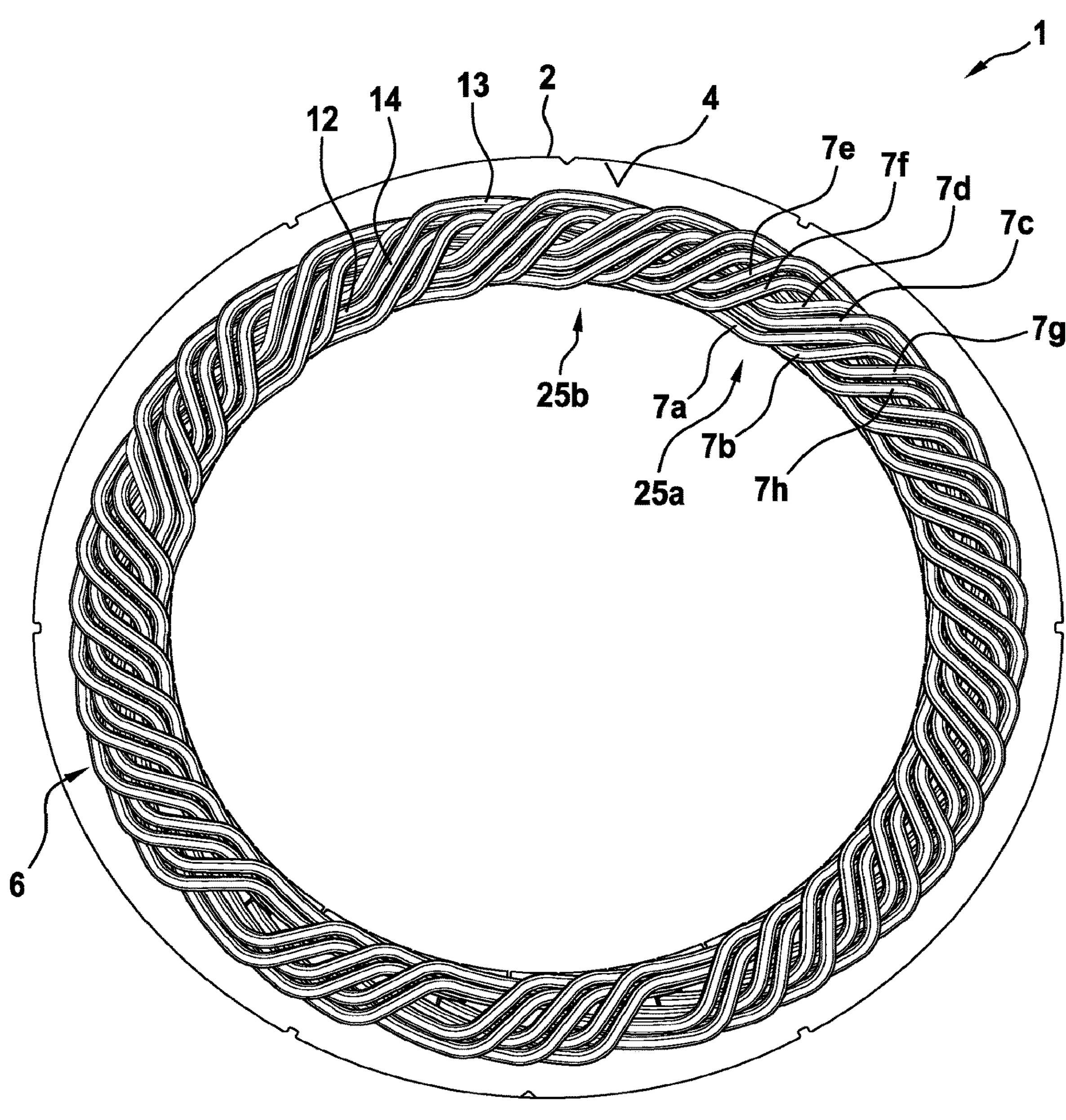
FIG. 3 shows an end-side view of the stator according to the first exemplary embodiment.

FIG. 3 is an end-side view of the stator 1 according to the first exemplary embodiment.

As can be derived from FIG. 3, the inner portion 12 and the outer portion 13 of a respective shaped conductor 7 extend in the circumferential direction, whereby the outer portion 13 is disposed radially further outward than the inner portion 12. The offset portion 14 has a greater radial extent than the inner portion 12 and the outer portion 13. As can be seen when viewed in combination with FIG. 1, the inner and outer portions 12, 13 extend in the axial direction away from the stator core 2. The offset portion 14 of the head portion 10 of a respective shaped conductor 7 forms a location of the head portion 10 that is axially furthest away from the stator core 2.

FIG. 3 furthermore shows that the shaped conductors 7 comprise a first shaped conductor 7*a*, a second shaped conductor 7*b*, a third shaped conductor 7*c* and a fourth shaped conductor 7*d*. Moreover, a fifth shaped conductor 7*e*, a sixth shaped conductor 7*f*, a seventh shaped conductor 7*g* and an eighth shaped conductor 7*h* are indicated in FIG. 3. In the following, the leg portions 8, 9, the head portion 10, the inner portion 12, the outer portion 13, the offset portion 14 and the connecting portions 15, 16 of a respective more precisely designated shaped conductor 7*a* to 7*h* are identified by the same lower-case letter as the shaped conductor 7*a* to 7*h*.

Figure 4:
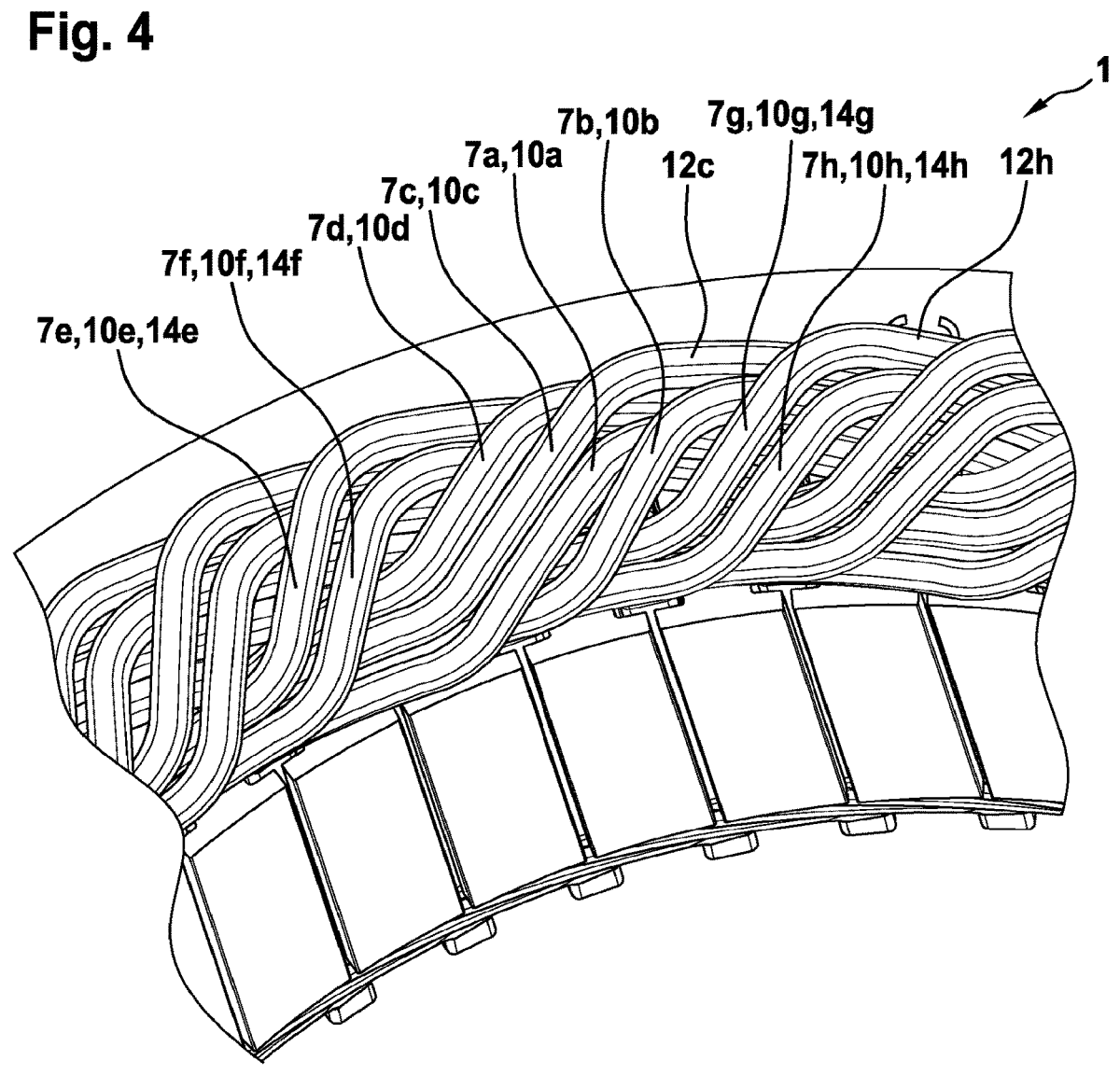
Figure 5:
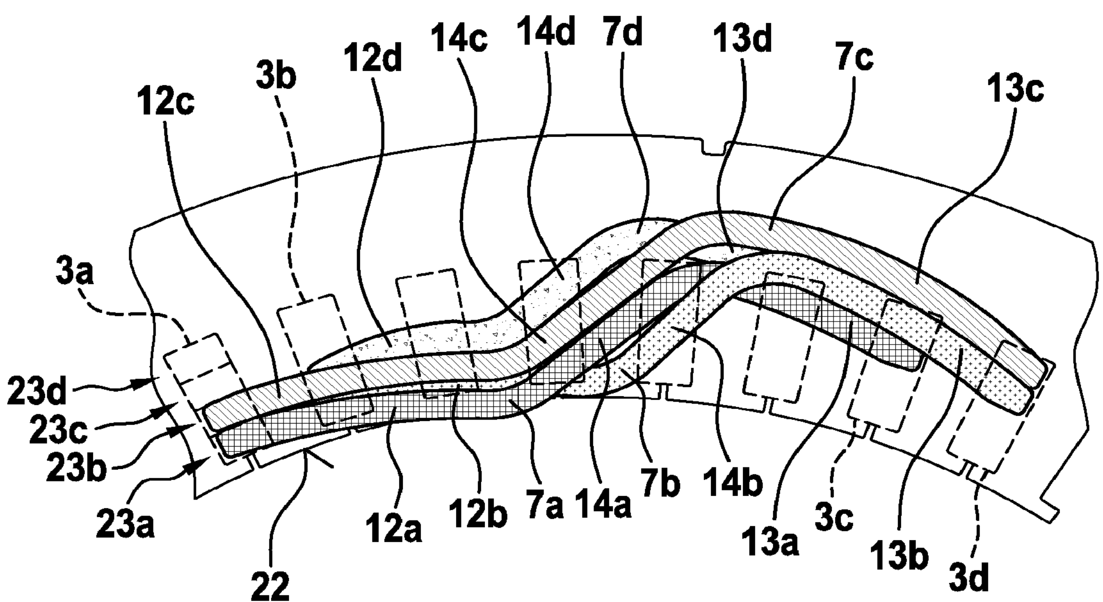
FIG. 5 shows an end-side view of the head portions of the first to fourth shaped conductor according to the first exemplary embodiment.
Figure 6:
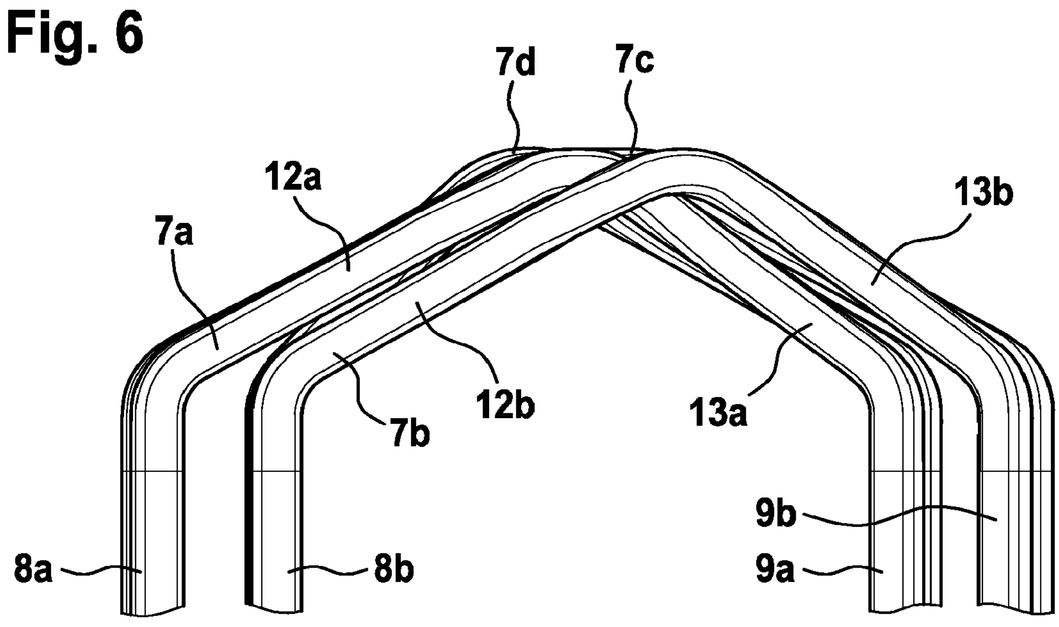
FIG. 6 shows a lateral view from the inside of the head portions of the first to fourth shaped conductor according to the first exemplary embodiment.
Figure 7:
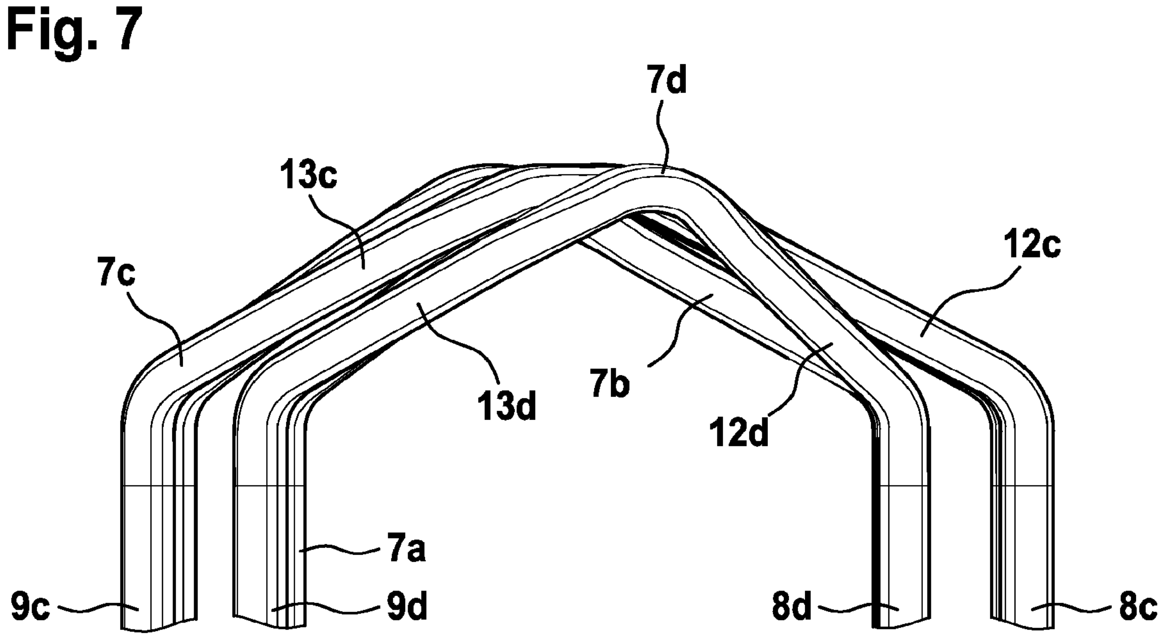
FIG. 7 shows a lateral view from the outside of the head portions of the first to fourth shaped conductor according to the first exemplary embodiment.

FIGS. 4 to 7 show the first to fourth shaped conductor 7*a* to 7*d*, whereby FIG. 4 is a perspective detailed view of the stator in the region of the first to fourth shaped conductor 7*a* to 7*d*, FIG. 5 is an end-side plan view, FIG. 6 is its lateral view from the inside, and FIG. 7 is a lateral view from the outside.

The first shaped conductor 7*a* and the second shaped conductor 7*b* have in each case an increment S. The third shaped conductor 7*c* has an increment S+1. The fourth shaped conductor 7*d* has an increment S−1. In the present exemplary embodiment, S=6 is selected by way of example, so that the increments of the first and the second shaped conductor 7*a*, 7*b* are six, the increment of the third shaped conductor 7*c* is seven, and the increment of the fourth shaped conductor 7*d* is five. Illustrated in FIG. 5 are the positions of eight grooves 3, 3*a*, 3*b*, 3*c* across which the first to fourth shaped conductors 7*a* to 7*d* extend.

The stator 1 is distinguished in particular in that the outer portion 13*c* runs radially further outward than the outer portions 13*a*, 13*b*, 13*d*, as is best seen in FIG. 5. Likewise, the outer portion 13*d* (in FIG. 5 partially obscured by the second shaped conductor 7*b*) runs radially further outward than the outer portion 13*a*. When viewed from the first end side, the outer portion 13*c* is the radially outermost portion of the outer portions 13*a* to 13*d*, and the outer portion 13*a* is the innermost portion of the outer portions 13*a* to 13*d*.

It can furthermore be seen in FIG. 5 that the outer portions 13*b* to 13*d* extend in each case radially outward beyond an outer radial delimitation of the grooves 3. Moreover, the inner portion 12*a* extends radially inward beyond an inner shell face 22 of the stator core 2 (see FIG. 1). The outer portion 13*b* covers the outer portion 13*d* with respect to the first end side 4. Moreover, the inner portion 12*c* covers the inner portion 12*b* with respect to the first end side 4. The offset portions 14*a*, 14*c*, 14*d* of the head portions 10*a*, 10*c*, 10*d* of the first, the third and the fourth shaped conductor 7*a*, 7*c*, 7*d* run side by side along an angular region of the circumferential direction, which occupies at least half of an angular region of the circumferential direction occupied by the offset portion 14*a*.

As can be derived in particular from FIG. 6 and FIG. 7, the outer portion 13*b* runs at least partially axially further away from the stator core 2 than the outer portion 13*d* and than the outer portion 13*a*. Likewise, the outer portion 13*b* runs axially further away from the stator core 2 than the outer portion 13*d* and than the outer portion 13*a*.

FIGS. 6 and 7 show in detail that the first leg portions 8*a*, 8*c* of the first and the third shaped conductor 7*a*, 7*c* are disposed in the same groove 3*a*, and the first leg portions 8*b*, 8*d* of the second and the fourth shaped conductor 7*b*, 7*d* are disposed in the same groove 3*b*. The groove 3*b* is directly adjacent to the groove 3*a* in the circumferential direction Furthermore, the second leg portions 9*a*, 9*d* of the first and the fourth shaped conductor 7*a*, 7*d* are disposed in the same groove 3*c*, and the second leg portions 9*b*, 9*c* are disposed in the same groove 3*d*. The groove 3*d* is directly adjacent to the groove 3*c* in the circumferential direction Moreover, each groove 3 is divided radially into first to fourth layers 23*a* to 23*d*, which are sequenced in the order of their designation from the inside to the outside, for receiving one of the leg portions 8, 9 of one of the shaped conductors 7. In the present exemplary embodiment, in the first shaped conductor 7*a*, the first leg portion 8*a* is disposed in the first layer 23*a*, and the second leg portion 9*a* is disposed in the third layer 23*c*. In the second shaped conductor 7*b*, the first leg portion 8*b* is disposed in the first layer 23*a*, and the second leg portion 9*b* is disposed in the third layer 23*c*. In the third shaped conductor 7*c*, the first leg portion 8*c* is disposed in the second layer 23*b*, and the second leg portion 9*c* is disposed in the fourth layer 23*d*. In the fourth shaped conductor 7*d*, the first leg portion 8*d* is disposed in the second layer 23*b*, and the second leg portion 9*d* is disposed in the fourth layer 23*d*.

FIG. 4 furthermore shows the fifth to eighth shaped conductors 7*e* to 7*h*, which have in each case the increment S. The first leg portions 8*e*, 8*f* of the fifth and the sixth shaped conductor 7*e*, 7*f* are disposed in the same groove 3 adjacent to the groove 3*a* in which the first leg portions 8*a*, 8*c* are disposed. The first leg portions 8*g*, 8*h* of the seventh and the eighth shaped conductor 7*g*, 7*h* are disposed in the same groove 3 adjacent to the groove 3*b* in which the first leg portions 8*b*, 8*d* are disposed. Furthermore, the first leg portions 8*e*, 8*h* of the fifth and the seventh shaped conductor 7*e*, 8*h* are disposed in the second layer 23*b*, and the first leg portions 8*f*, 8*g* of the sixth and the eighth shaped conductor 7*f*, 7*g* are disposed in the first layer 23*a*. The second leg portions 9*e*, 9*h* of the fifth and the seventh shaped conductor 7*e*, 8*h* are disposed in the fourth layer 23*d*, and the second leg portions 9*f*, 9*g* of the sixth and the eighth shaped conductor 7*f*, 7*g* are disposed in the third layer 23*c*.

The head portions 10*a* to 10*d* of the first to fourth shaped conductors 7*a* to 7*d* are disposed between the head portions 10*e*, 10*f* of the fifth and the sixth shaped conductor 7*e*, 7*f* and the head portions 10*g*, 10*h* of the seventh and the eighth shaped conductor 7*g*, 7*h*.

As can be seen in FIG. 4, the circumferential extent of the offset portions 14*e* to 14*h* of the fifth to eighth shaped conductors 7*e* to 7*h* is chosen as a function of a material thickness of the shaped conductors 7 and their bending radii to be so minor that the outer portion 12*h* of the head portion 10*h* of the seventh shaped conductor 7*h* axially covers the outer portion 12*c* of the head portion 10*c* of the third shaped conductor 7*c*. As a result of this configuration of the fifth to eighth shaped conductors 7*e* to 7*h*, these are spread out to form a gap between the fifth and the sixth shaped conductor 7*e*, 7*f* on the one hand, and the seventh and the eighth shaped conductor 7*g*, 7*h* on the other hand, into which the first to fourth shaped conductors 7*a* to 7*d* can be inserted. The gap also permits a joining process of a shaped conductor cage that for manufacturing the stator 1 is introduced with the leg portions 8, 9 ahead into the grooves 3 to be kept simple.

Figure 8:
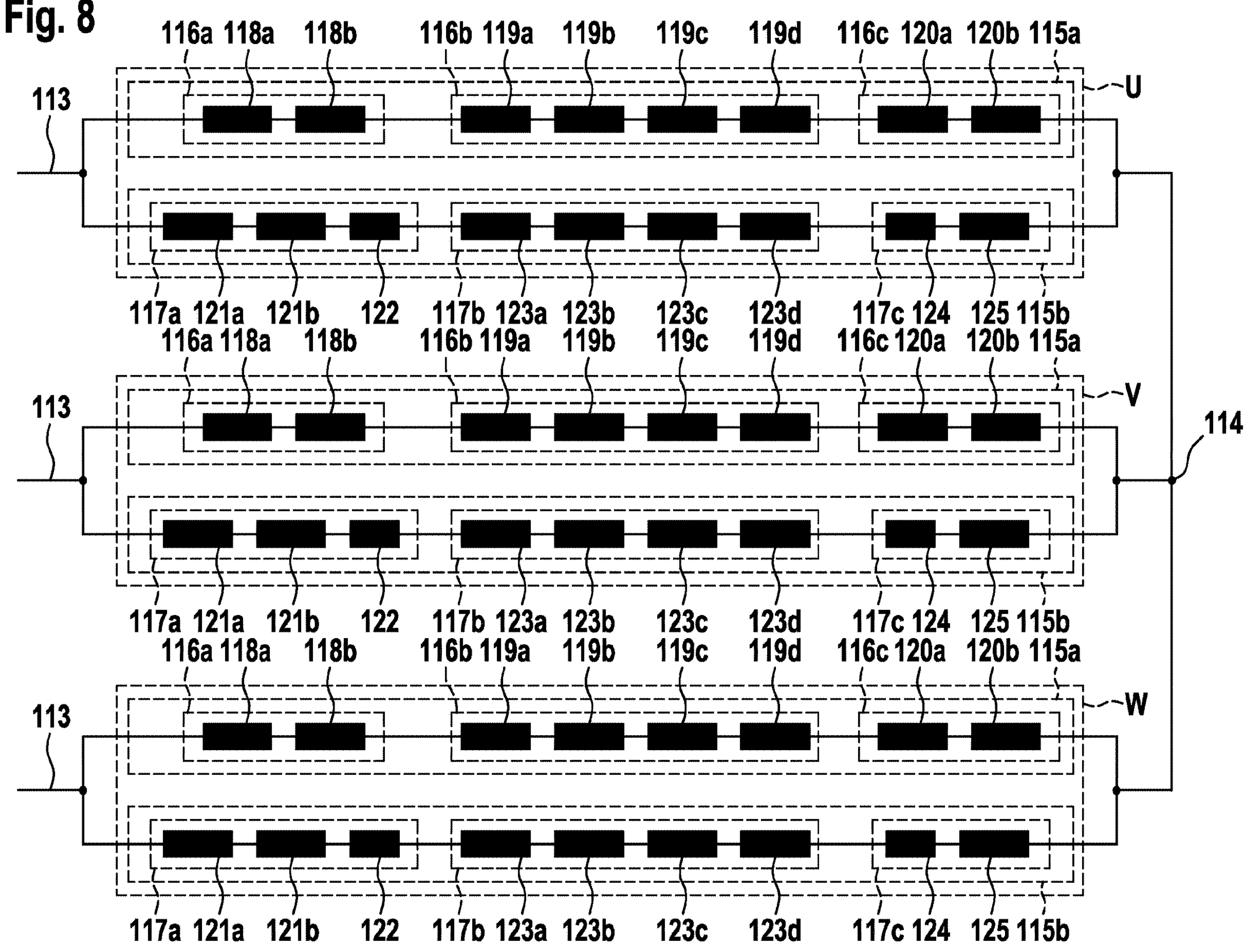
FIG. 8 shows a block diagram of the stator winding of the stator according to the first exemplary embodiment.

FIG. 8 is a block diagram of the stator winding of the stator 1 according to the first exemplary embodiment.

In the exemplary configuration shown, the stator 1 has N=3 phases U, V, W and P=4 pole pairs and a hole count q=2. For each phase U, V, W, the shaped conductors 7 form a first current path 115*a* and a second current path 115*b*. The current paths 115*a*, 115*b* of a respective phase U, V, W are connected in parallel. Alternatively, a connection of the current paths 115*a*, 115*b* in series is also possible. The shaped conductors 7 of a respective current path 115*a*, 115*b* are connected in series. For each of the phases U, V, W, the current paths 115*a*, 115*b* are constructed as follows:

The shaped conductors 7 of the first current path 115*a* form a first portion 116*a*, a second portion 116*b* and a third portion 116*c* in the order of a phase connection 113 to a star point 114. Likewise, the shaped conductors 7 of the second current path 115*b* form a first portion 117*a*, a second portion 117*b* and a third portion 117*c* in the sequence from the phase connection 113 to the star point 114.

The shaped conductors 7 of the first portion 116*a* of the first current path 115*a* form first to $[(P/2)^{th}]$ groups of a first type 118*a*, 118*b* of leg portions 8, 9 connected in series, here form a first group of the first type 118*a* and a second group of the first type 118*b*. The shaped conductors 7 of the second portion 116*b* of the first current path 115*a* form first to $P^{th}$ groups of a second type 119*a-d* of leg portions 8, 9 connected in series, here a first group of the second type 119*a*, a second group of the second type 119*b*, a third group of the second type 119*c* and a fourth group of the second type 119*d*. The shaped conductors 7 of the third portion 116*c* of the first current path 115*a* form first to $[(P/2)^{th}]$ groups of a first type 120*a*, 120*b* of leg portions 8, 9 connected in series, here a first group of the first type 120*a* and a second group of the first type 120*b*.

The shaped conductors 7 of the first portion 117*a* of the second current path 115*b* form first to $[(P/2)^{th}]$ groups of a second type 121*a*, 121*b* of leg portions connected in series 8, 9, here a first group of the second type 121*a* and a second group of the second type 121*b*, and a half-group of the first type 122 which on the side thereof facing away from the second portion 117*b* is connected in series to the groups of the second type 121*a*, 121*b*. The shaped conductors 7 of the second portion 117*b* of the second current path 115*b* form first to $P^{th}$ groups of a third type 123*a-d* of leg portions 8, 9 connected in series, here a first group of the third type 123*a*, a second group of the third type 123*b*, a third group of the third type 123*c* and a fourth group of the third type 123*d*. The shaped conductors 7 of the third portion 117*c* of the second current path 115*a* form a half-group of a second type 124 as well as first to $[(P/2-1)^{th}]$ groups of a second type 125 of leg portions 8, 9 connected in series, here a (first) group of the second type 125 which on the side thereof facing the second portion 117*b* is connected in series to the half-group of the second type 124.

The portions 116*a-c*, 117*a-c* and the groups of first, second and third types 118*a*, 118*b*, 119*a-d*, 120*a*, 120*b*, 121*a*, 121*b*, 123*a-d*, 125 herein are denoted in their respective order in terms of the series connection, here counted from the phase connection 113 to the star point 114.

Figure 9:
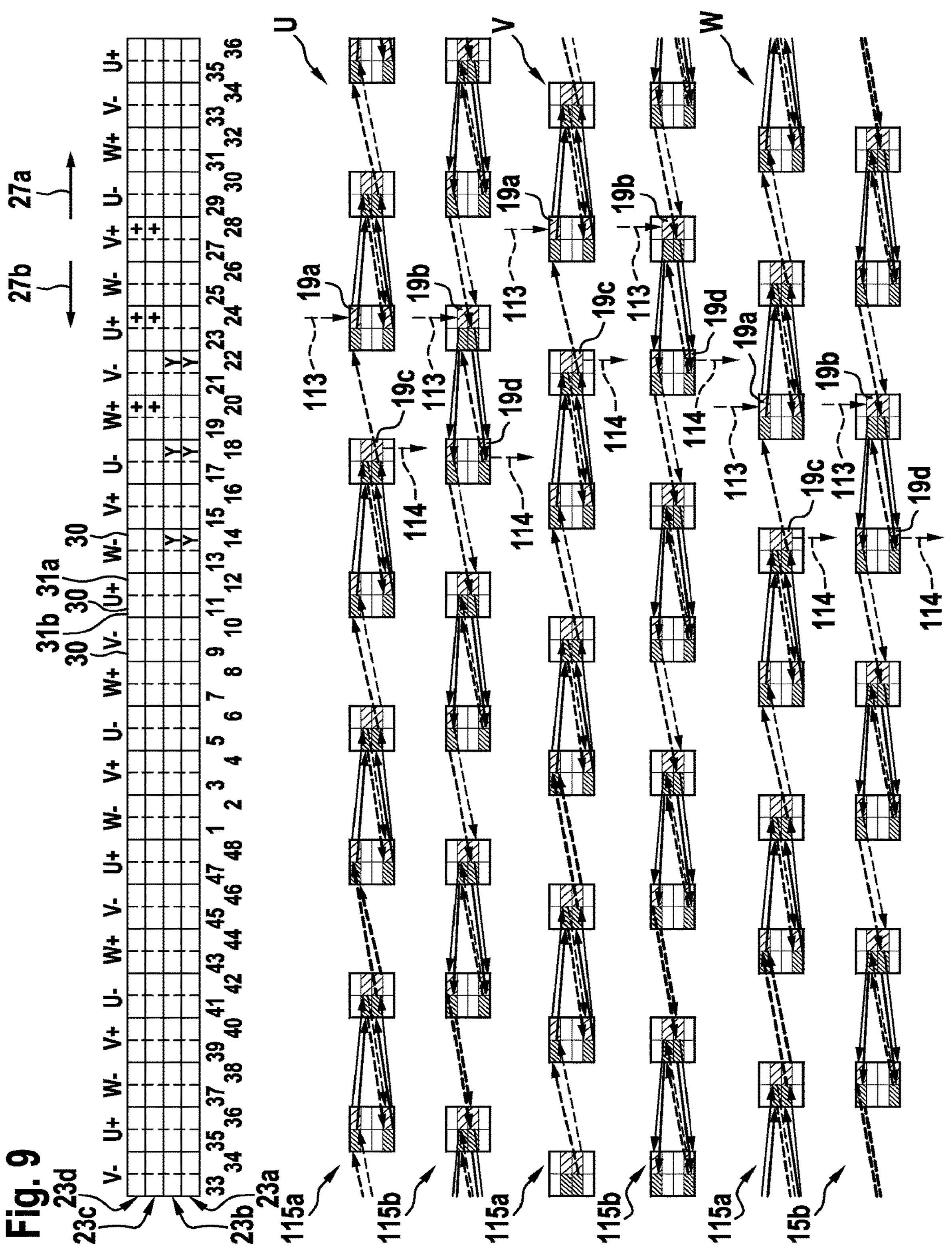
FIG. 9 shows a winding diagram of the stator winding of the stator according to the first exemplary embodiment.
Figure 10:
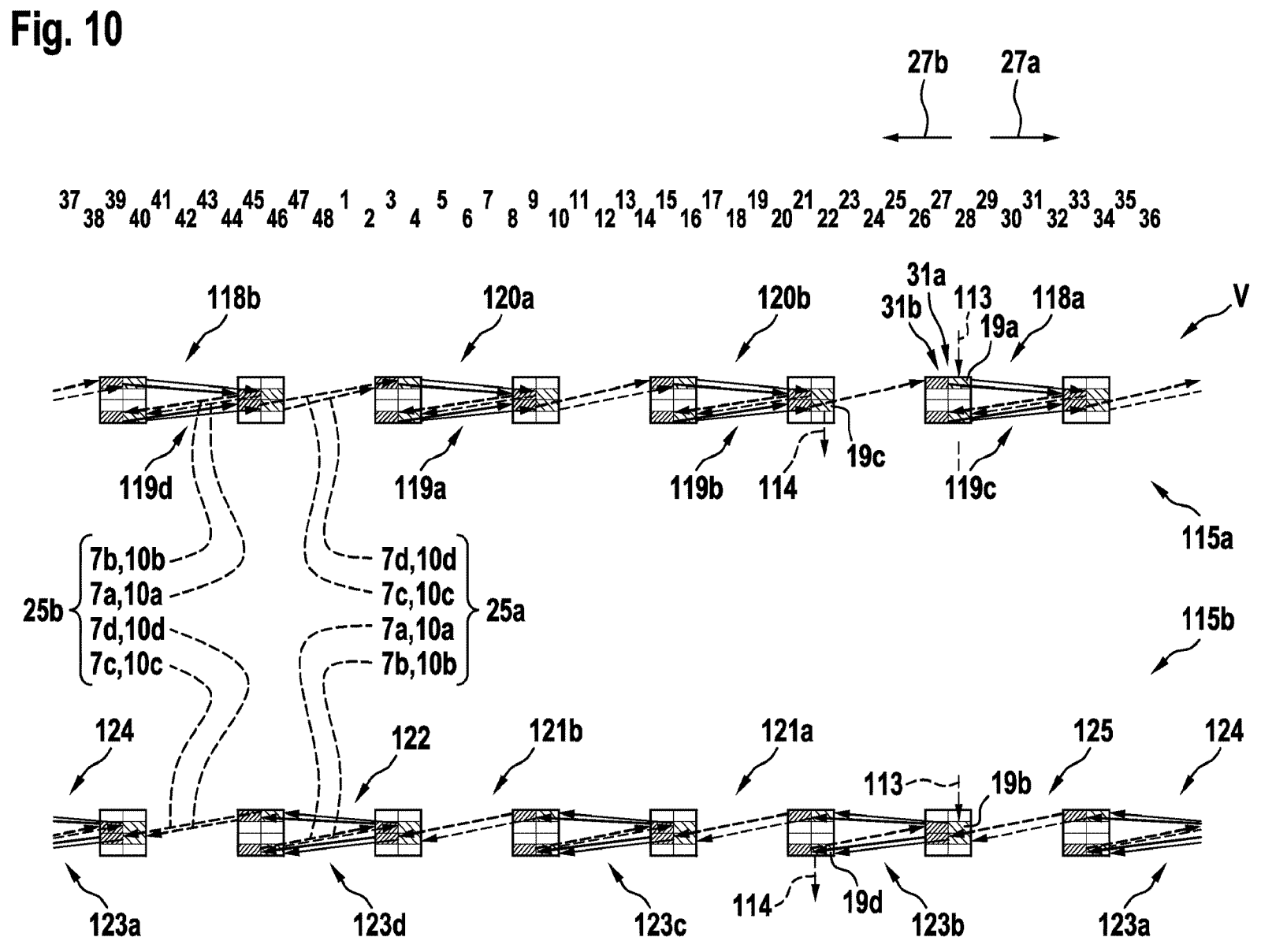

FIG. 9 is a winding diagram of the stator winding of the stator according to the first exemplary embodiment. FIG. 10 is a fragment of the winding diagram shown in FIG. 9 for a strand V according to the first exemplary embodiment.

The stator 1 has a total of $2 \cdot P \cdot N \cdot q = 48$ grooves 3. The hole count q therefore describes the ratio of the number of grooves 3 to the product resulting from the number of poles $2 \cdot P$ and the number of phases N.

Each layer 23*a* to 23*d* of a respective groove 3 forms a receptacle space for exactly one leg portion 8, 9, 19. This results in a total number of 2·P·N·q·L=192 receptacle spaces or leg portions 8, 9, 19 of the stator 1, where L describes the number of layers 23*a* to 23*d*.

FIG. 9, by way of two arrows disposed above the upper table, shows a first circumferential direction 27*a* which, when viewed from the first end side 7 of the stator 1, corresponds to the clockwise direction, and the second circumferential direction 27*b* which, when viewed from the first end side 7 of the stator 1, corresponds to the counter-clockwise direction (see also FIG. 1). FIG. 9 furthermore shows a groove numbering from 1 to 48 below the upper table. The upper table in FIG. 9 shows to which strand U, V, W a leg portion 8, 9, 19 disposed in a respective receptacle space belongs, whereby a direction of an electric current through the corresponding leg portion 8, 9, 19 is identified by the suffix "+" or "–", respectively.

Furthermore, receptacle spaces for a leg portion 19*a* of a first shaped terminal conductor 18 of a respective first current path 115*a*, and for a leg portion 19*b* of a first shaped terminal conductor 18 of a respective second current path 115*b*, are marked with "+" in the upper table. The leg portions 19*a*, 19*b* are connected to the phase connection 113. Moreover, receptacle spaces for a leg portion 19*c* of a second shaped terminal conductor 18 of a respective first current path 115*a*, and for a leg portion 19*d* of a second shaped terminal conductor 18 of a respective second current path 115*b* in terms of the series connection, are marked with "Y". The leg portions 19*c*, 19*d* are connected to the star point 114. The leg portions 19*a* to 19*d* are the outer leg portions of the current paths 115*a*, 115*b* in terms of the series connection.

As can be seen, the shaped conductors of each phase U, V, Ware disposed in 2·P=8 winding zones 30 which comprise in each case precisely q·L=8 receptacle spaces. Each winding zone 30 is subdivided into q=2 sub-winding zones 31*a*, 31*b*. In each winding zone 30, the first sub-winding zone 31*a* follows the second sub-winding zone 31*b* along the first circumferential direction 27*a*. Each sub-winding zone 31*a*, 31*b* extends over all four layers 23*a* to 23*d*. In the present exemplary embodiment, each sub-winding zone 31*a*, 31*b* by way of example is in exactly one groove 3.

Between the receptacle spaces or the leg portions 8, 9, 19, the head portions 10 are marked with dashed arrows and the connecting portions 15, 16 with solid arrows.

The shaped conductors of a respective current path 115*a*, 115*b* form a combined lap and wave winding.

The illustration of the shaped conductors 7 and of the head portions for phase V is representative of the remaining phases U, W, in which the disposal of the shaped conductors 7 corresponds to that of phase V, except for a displacement of q=2 grooves 3. The structure of the stator winding will be explained hereunder by means of phase V.

FIG. 10 is a detailed view of the winding diagram for phase V.

In the first current path 15*a*, the leg portions 8, 9, 19*a* of the first portion 116*a*, i.e. those of the groups of the first type 118*a*, 118*b*, and the leg portions 8, 9 of the third portion 31*c*, i.e. those of the groups of the first type 120*a*, 120*b*, are in each case disposed in the first sub-winding zone 116*a*. The leg portions 8, 9 of the second portion 116*b*, i.e. those of the groups of the second type 119*a-d*, are disposed in the second sub-winding zone 31*b*. In the second path 115*b*, the leg portions 8, 9, 19*b* of the first portion 117*a*, i.e. those of the groups of the second type 121*a*, 121*b* and the half-group of the first type 122, and the leg portions 8, 9, 19*d* of the third portion 117*c*, i.e. the half-group of the second type 124 and the group of the second type 125, are disposed in the first sub-winding zone 31*a*. The leg portions 8, 9 of the second portion 117*b*, i.e. those of the groups of the third type 123*a-d*, are in each case disposed in the second sub-winding zone 31*b*. The leg portions 19*a*, 19*b* of the first shaped terminal conductor 18 of the first and the second path 15*a*, 15*b* are disposed in the same sub-winding zone 31*a*, and the leg portions 19*c*, 19*d* of the second shaped terminal conductor 18 of the first and the second current path 115*a*, 115*b* are disposed in the same sub-winding zone 31*b*. Here, the leg portions 19*a*, 19*b* are disposed in the first sub-winding zone 31*a*, while the leg portions 19*c*, 19*d* are disposed in the second sub-winding zone 31*a*.

The current paths 115*a*, 115*b* extend along different circumferential directions 27*a*, 27*b*. Here, the first current path 115*a* extends along the first circumferential direction 27*a* and the second current path 115*b* along the second circumferential direction 27*b*. Within a respective current path 115*a*, 115*b*, the first to third portions 116*a-c*, 117*a-c* extend along the same circumferential direction 27*a*, 27*b*.

In the strand V, the first to fourth shaped conductors 7*a* to 7*b* form a first shaped conductor assembly 25*a*, in which the third shaped conductor 7*a* and the fourth shaped conductor 7*b* are wired in the first current path 115*a*, and the first shaped conductor 7*a* and the second shaped conductor 7*b* are wired in the second current path 115. Provided in the strand V is a second corresponding shaped conductor assembly 25*b* in which the first shaped conductor 7*a* and the second shaped conductor 7*b* are wired in the first current path 115*a*, and the third shaped conductor 7*c* and the fourth shaped conductor 7*d* are wired in the second current path 115*b*. Accordingly, a first shaped conductor assembly 25*a* and a second shaped conductor assembly 25*b* are also provided in the other strands U, W.

Figure 11:
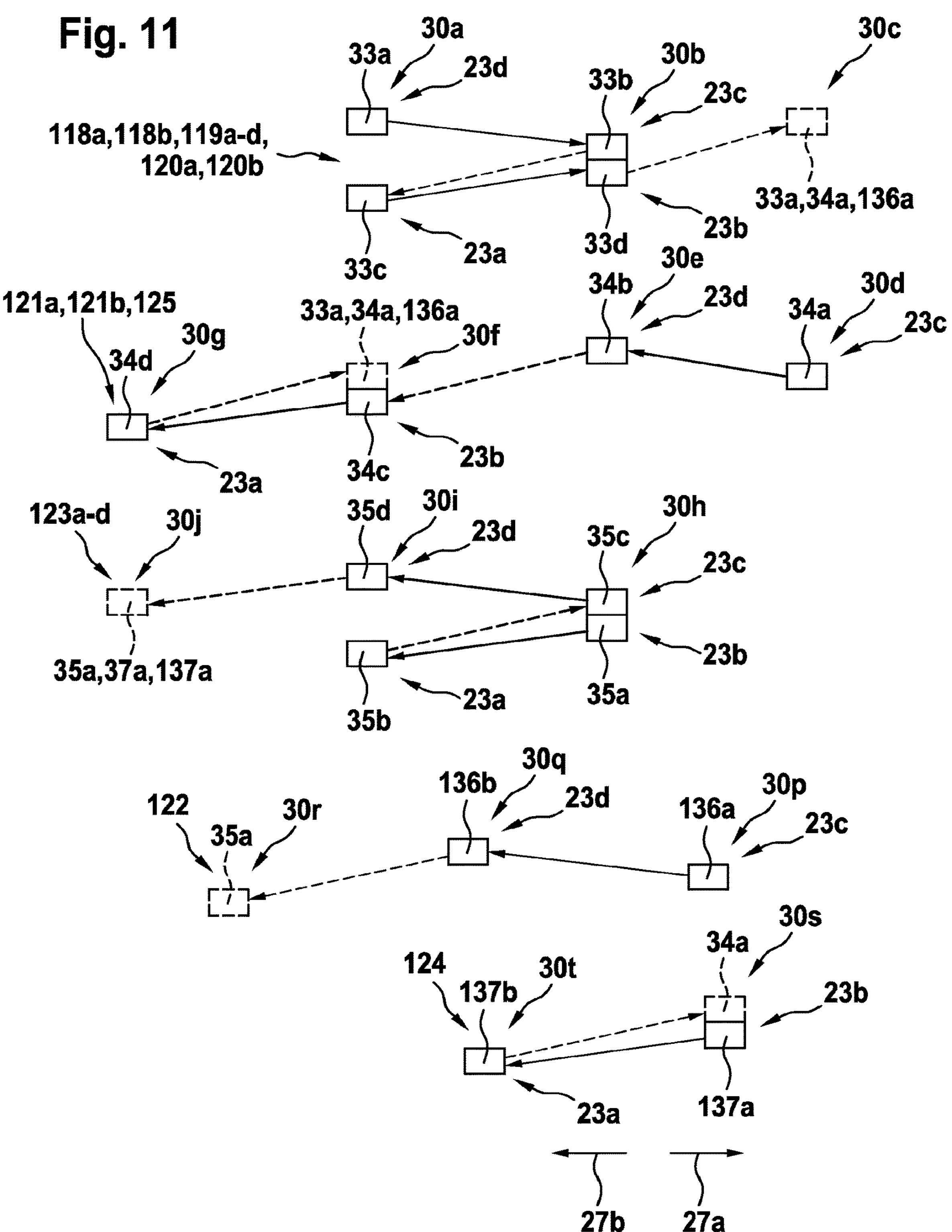
FIG. 11 shows detailed views of the disposal of shaped conductors according to the winding scheme shown in FIG. 9 and according to the first exemplary embodiment.
Figure 12:
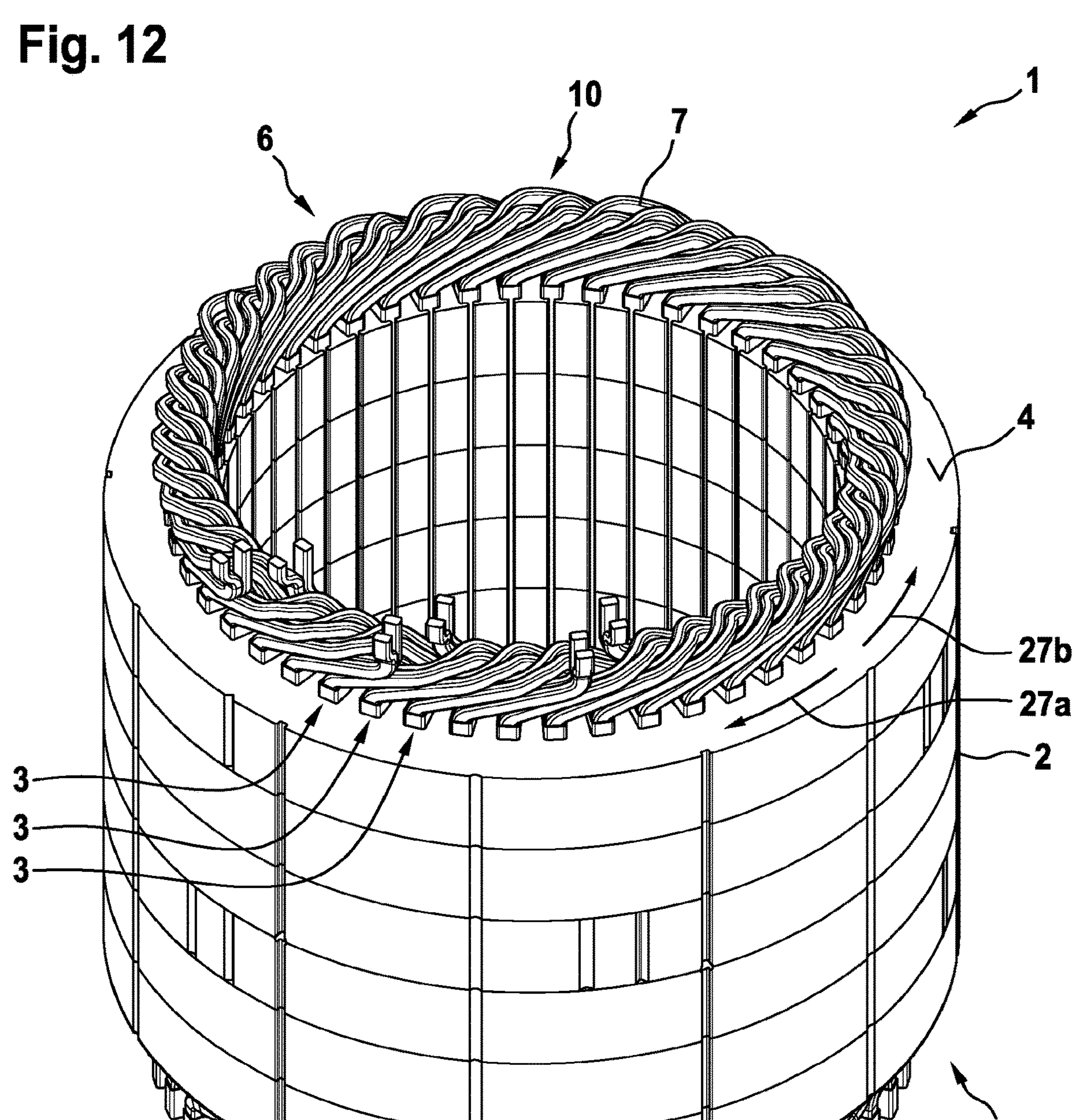
FIG. 12 shows an end-side view of a second exemplary embodiment of the stator according to the invention.
Figure 13:
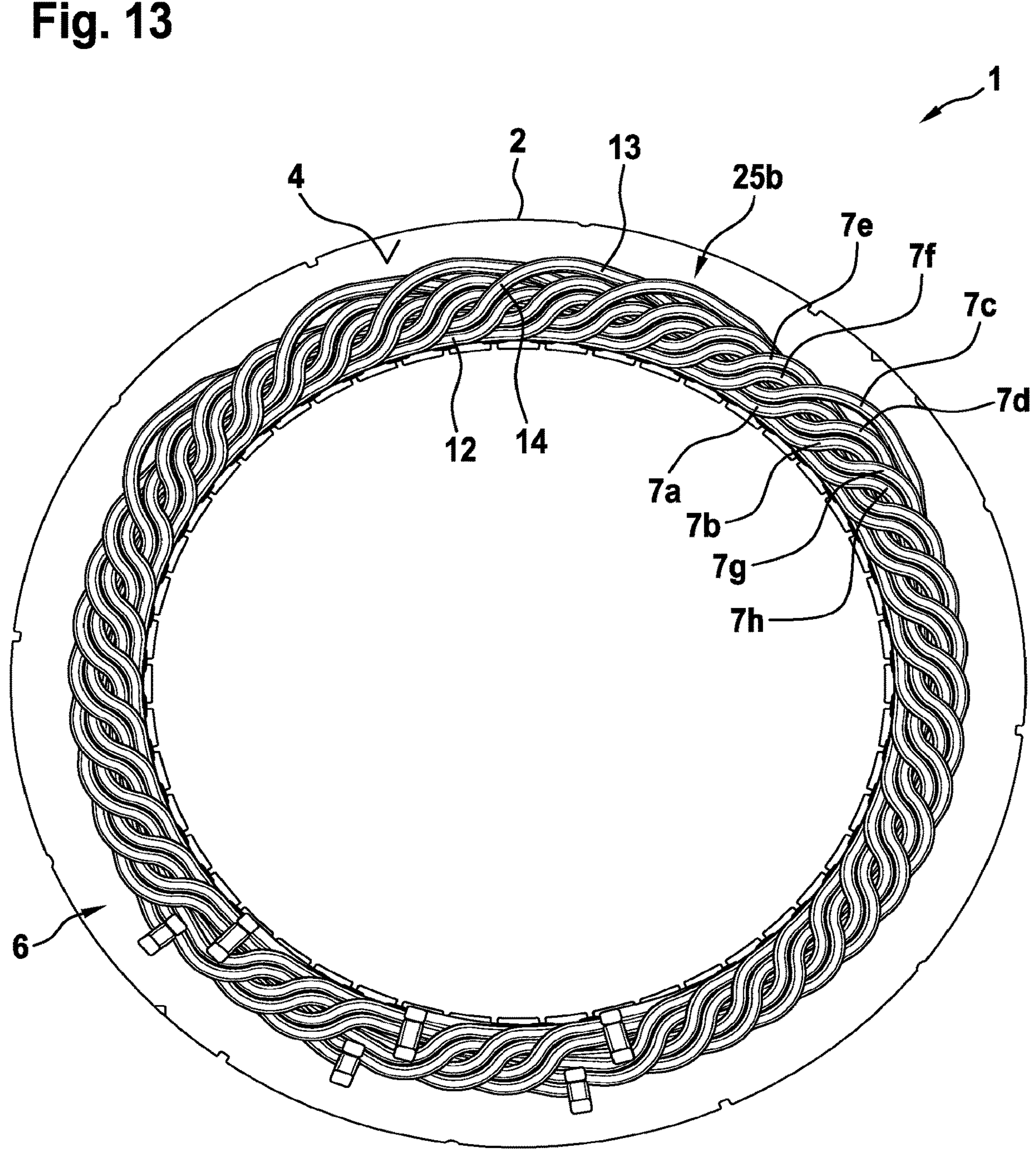
FIG. 13 shows a perspective detailed view of the stator in the region of the first to fourth shaped conductor according to the second exemplary embodiment.
Figure 14:
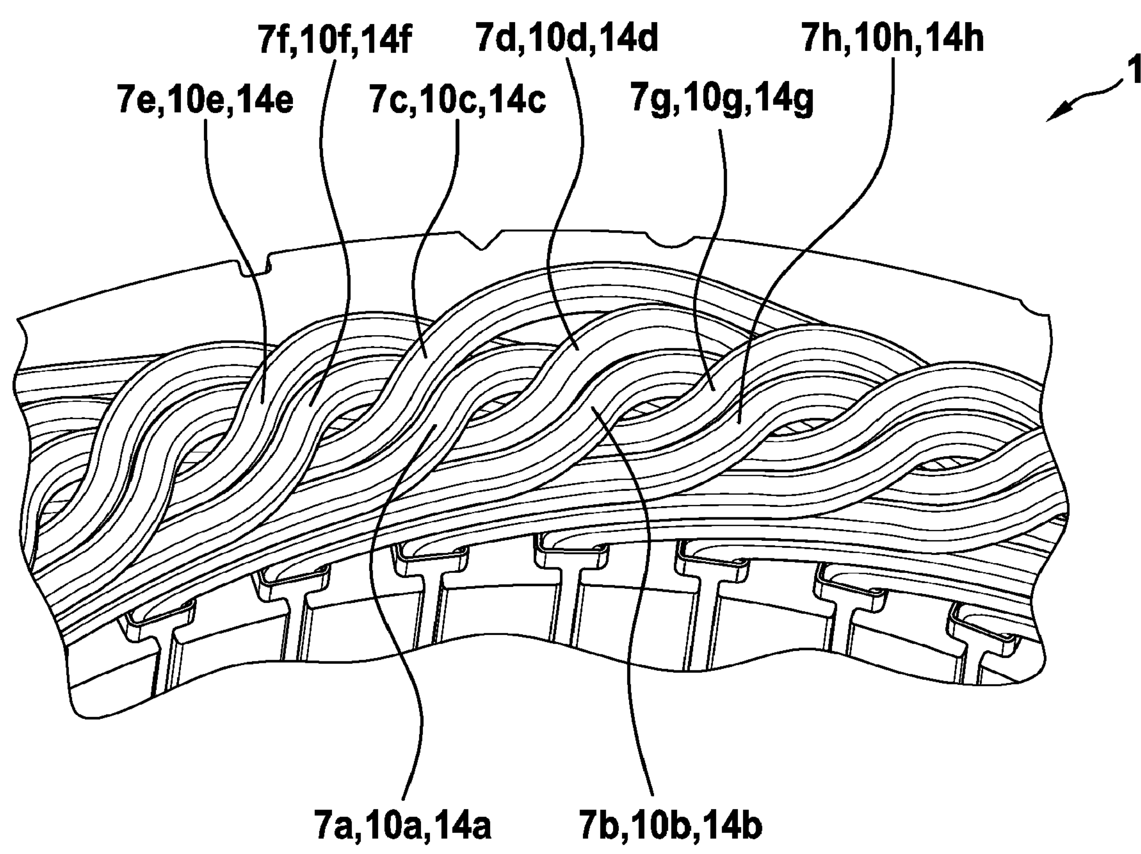
FIG. 14 shows a perspective detailed view of the stator in the region of the first to fourth shaped conductor according to the first exemplary embodiment.
Figure 15:
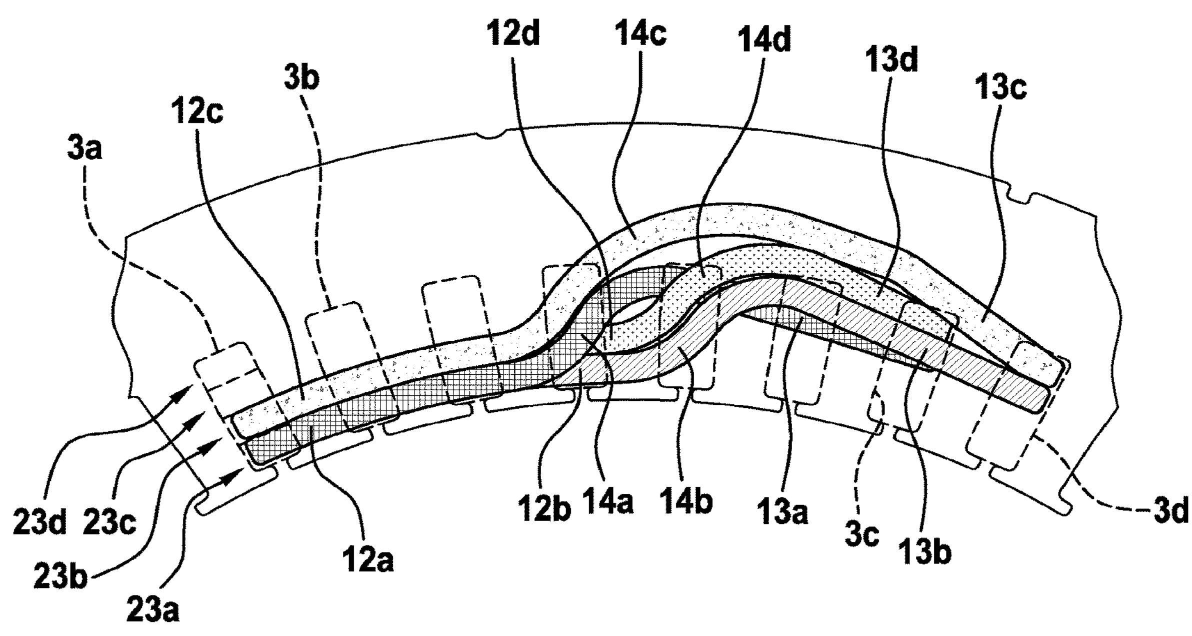
FIG. 15 shows an end-side view of the head portions of the first to fourth shaped conductor according to the second exemplary embodiment.
Figure 16:
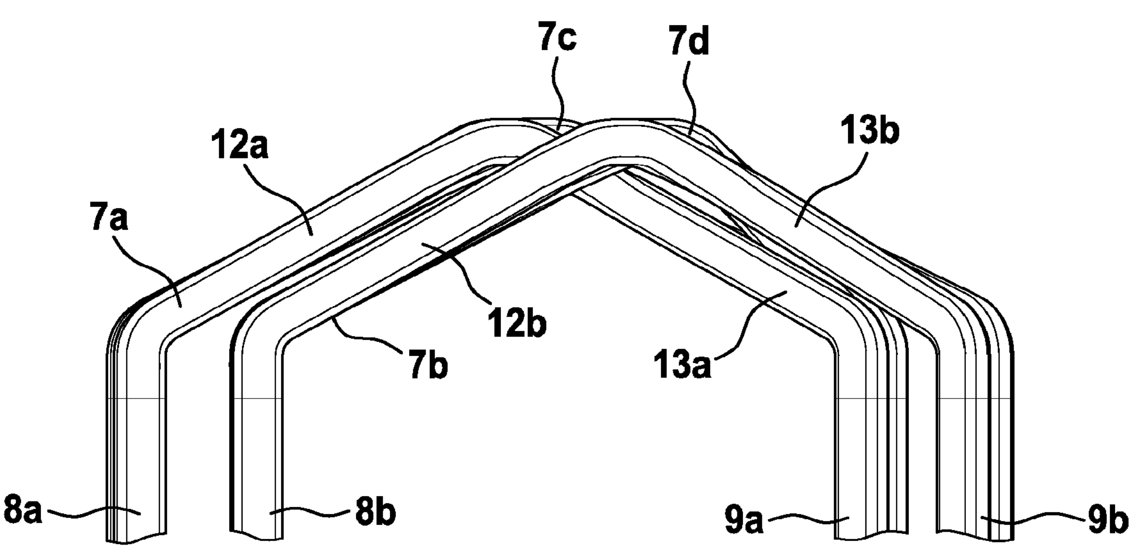
FIG. 16 shows a lateral view from the inside of the head portions of the first to fourth shaped conductor according to the second exemplary embodiment.
Figure 17:
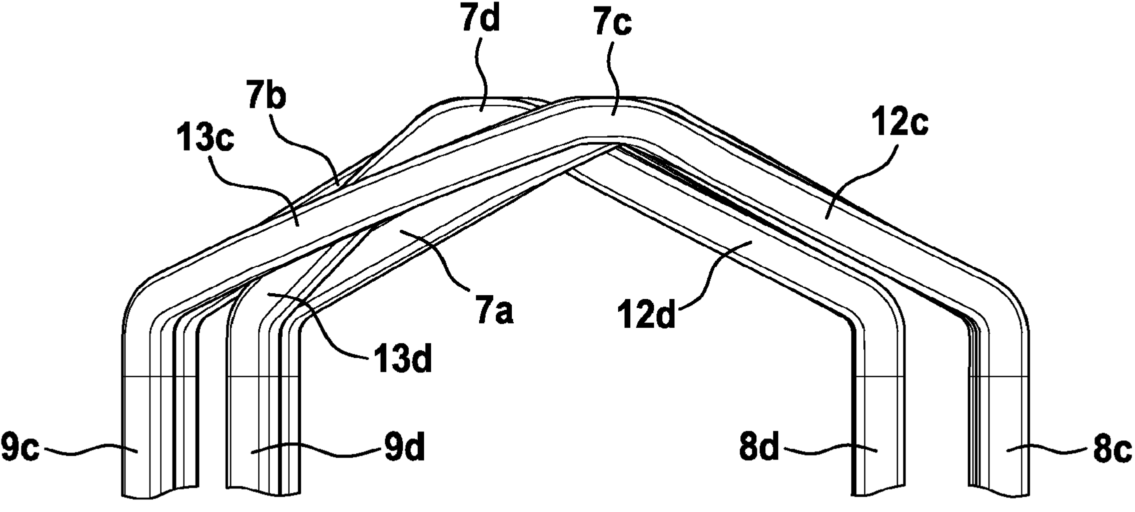
FIG. 17 shows a lateral view from the outside of the head portions of the first to fourth shaped conductor according to the second exemplary embodiment.

FIG. 11 is a detailed illustration of the groups 118*a*, 118*b*, 119*a-d*, 120*a*, 120*b*, 121*a*, 121*b*, 123*a-d* and 125 and half-groups 122, 124 of leg portions 8, 9, 19 according to the first exemplary embodiment.

The groups of the first type 118*a*, 118*b*, 119*a-d*, 120*a*, 120*b* comprise four consecutive leg portions 8, 9, 19 in terms of the series connection, which are separately designated and numbered with 33*a-d*. Furthermore, three adjacent winding zones 30 are separately designated with 30*a-c*. In the groups of the first type 118*a*, 118*b*, 119*a-d*, 120*a*, 120*b*, a first leg portion 33*a* is disposed in the fourth layer 23*d* of one of the winding zones 30*a*. A second leg portion 33*b* is disposed in the third layer 23*c* of a winding zone 30*b* which along the first circumferential direction 27*a* is adjacent to the winding zone 30*a* in which the first leg portion 33*a* is disposed. A third leg portion 33*c* is disposed in the first layer 23*d* of the winding zone 30*a*, in which the first leg portion 33*a* is disposed. A fourth leg portion 33*d* is disposed in the second layer 23*b* of the winding zone 30*b*, in which the second shaped conductor 33*b* is disposed.

The groups of the second type 121*a*, 121*b*, 125 comprise four consecutive leg portions 8, 9, 19 in terms of the series connection, which are separately designated and numbered with 34*a* to 34*d*. Furthermore, four adjacent winding zones 30 are separately designated with 30*d-g* in FIG. 11. In the groups of the second type 121*a*, 121*b*, 125, a first leg portion 34*a* is disposed in the third layer 23*c* of one of the winding zones 30*d*. A second leg portion 34*b* is disposed in the fourth layer 23*d* of a winding zone 30*e* which along the second circumferential direction 27*b* is adjacent to the winding zone 30*d* in which the second leg portion 34*a* is disposed. A third leg portion 34*c* is disposed in the second layer 23*b* of a winding zone 30*f* which along the second circumferential direction 27*b* is adjacent to the winding zone 30*e* in which the second leg portion 34*b* is disposed. A fourth leg portion 34*d* is disposed in the first layer 23*a* of a winding zone 30*g* which along the second circumferential direction 27*b* is adjacent to the winding zone 30*f* in which the third leg portion 34*c* is disposed.

The groups of the third type 123*a-d* comprise four consecutive leg portions in terms of the series connection, which are separately designated and numbered with 35*a-d*. Furthermore, three adjacent winding zones 30 are separately designated with 30*h* to 30*j* in FIG. 11. In the groups of the third type 123*a-d*, a first leg portion 35*a* is disposed in the second layer 23*b* of one of the winding zones 30*h*. A second leg portion 35*b* is disposed in the first layer 23*a* of a winding zone 30*i* which along the second circumferential direction 27*b* is adjacent to the winding zone 30*h* in which the first leg portion 35*a* is disposed. A third leg portion 35*c* is disposed in the third layer 23*c* of the winding zone 30*h* in which the first leg portion 35*a* is disposed. A fourth leg portion 35*d* is disposed in the fourth layer 23*d* of the winding zone 30*i* in which the second leg portion 35*b* is disposed.

The half-group of the first type 122 comprises two consecutive leg portions in terms of the series connection, which are separately designated and numbered with 136*a*, 136*b*. Furthermore, three adjacent winding zones 30 are separately designated with 30*p* to 30*r* in FIG. 11. In the half-group of the first type 122, a first leg portion 136*a* is disposed in the third layer 23*c* of one of the winding zones 30*p*. A second leg portion 136*b* is disposed in the fourth layer 23*d* of a winding zone 30*q* which along the second circumferential direction 27*b* is adjacent to the winding zone 30*p* in which the second leg portion 136*a* is disposed.

The half-group of the second type 124 comprises two consecutive leg portions in terms of the series connection, which are separately designated and numbered with 137*a*, 137*b* Furthermore, in FIG. 11, two adjacent winding zones 30 are separately designated with 30*s*, 30*t*. In the half-group of the second type 124, a first leg portion 137*a* is disposed in the second layer 23*b* of one of the winding zones 30*s*. A second leg portion 137*b* is disposed in the first layer 23*a* of a winding zone 30*t* which along the second circumferential direction 27*b* is adjacent to the winding zone 30*s* in which the first leg portion 137*a* is disposed.

The first leg portion 33*a* of such groups of the first type 118*b*, 119*a-d*, 120*a*, 120*b* which, in terms of the series connection, immediately follow a fourth leg portion 33*d* of another of the groups of the first type 118*a*, 118*b*, 119*a-d*, 120*a*, is disposed in that winding zone 30*c* that along the first circumferential direction 27*a* follows the winding zone 30*b* in which the fourth leg portion 33*d* is disposed.

The first leg portion 34*a* of such groups of the second type 121*b* which, in terms of the series connection, immediately follow a fourth leg portion 34*d* of another of the groups of the second type 121*a*, is disposed in that winding zone 30*f* in which the third leg portion 34*c* of the other group of the second type 121*a* is disposed.

The first leg portion 35*a* of that group of the third type 123*a* that, in terms of the series connection, immediately follows the second leg portion 136*b* of the half-group of the first type 122, is disposed in that winding zone 30*r* that along the second circumferential direction 27*b* follows the winding zone 30*q* in which the second leg portion 136*b* of the half-group of the first type 122 is disposed.

The first leg portion 137*a* of the half-group of the second type 124 is disposed in that winding zone 30*j* that along the second circumferential direction 27*b* follows the winding zone 30*i* in which the fourth leg portion of the group of the third type 123*d* is disposed.

The first leg portion 34*a* (see FIG. 10) of that group of the second type 125 that, in terms of the series connection, immediately follows the second leg portion 137*b* of the half-group of the second type 124, is disposed in that winding zone 30*s* in which the first leg portion 137*a* of the half-group of the second type 124 is disposed.

FIG. 12 to FIG. 17 show a second exemplary embodiment of a stator 1. The illustration in FIG. 12 corresponds to that in FIG. 1, and the illustrations in FIG. 13 to FIG. 17 correspond to those in FIG. 3 to FIG. 7. Unless otherwise mentioned hereunder, all embodiments pertaining to the first exemplary embodiment can be applied to the stator 1 according to the second exemplary embodiment. The same or equivalent components are provided with identical reference signs herein.

In the second exemplary embodiment, the outer portion 13*c* runs at least in portions radially further outward than the outer portion 13*e* of the head portion 10*e* of the seventh shaped conductor 7*e*, and than the outer portion 13*g* of the head portion 10*g* of the seventh shaped conductor 7*g*. The outer portion 13*b* runs at least partially radially further inward than the outer portion 13*d*. The outer portion of the head portion 13*b* at least partially covers the outer portion 13*a* with respect to the end side 4.

Moreover, in the second exemplary embodiment, the head portions 10*a*, 10*b*, 10*f* of the first, the second and the sixth shaped conductor 7*a*, 7*b*, 7*f* are identically shaped. Likewise, the head portions 10*d* and 10*e* of the fourth and the fifth shaped conductor 7*d*, 7*e* are identically shaped.

Figure 18:
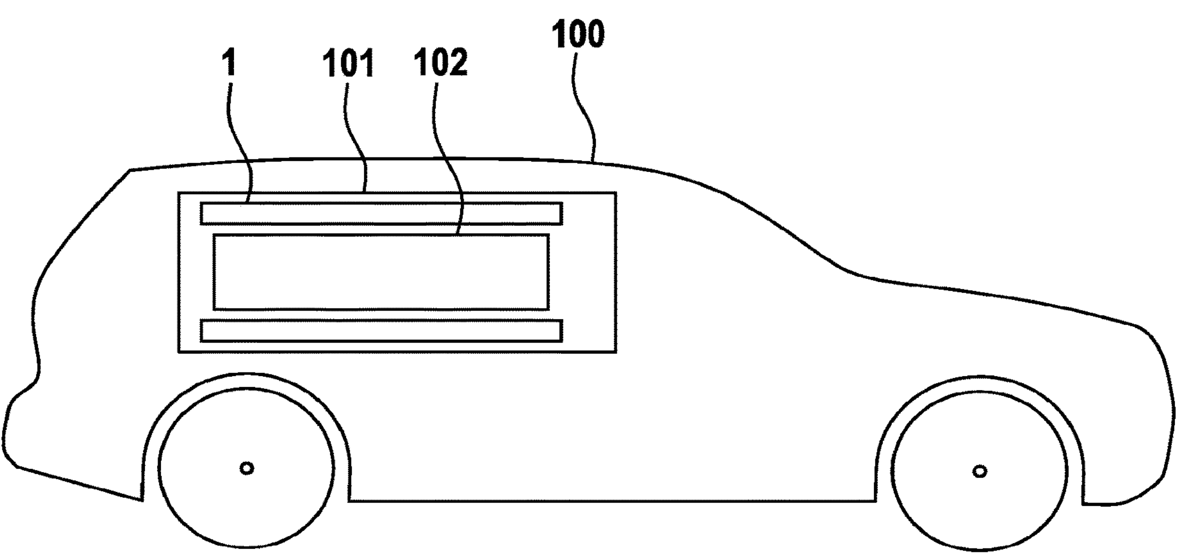
FIG. 18 shows a diagram of an exemplary embodiment of the vehicle according to the invention having an exemplary embodiment of the electrical machine according to the invention.

FIG. 18 is a diagram of an exemplary embodiment of a vehicle 100 having an exemplary embodiment of an electrical machine 101.

The electrical machine 101 comprises a stator 1 according to one of the embodiments described above, and a rotor 102 which is mounted so as to be rotatable relative to the stator 1. The electrical machine 101 is a permanently excited synchronous machine, a synchronous reluctance machine or an asynchronous machine/induction machine and is specified to drive the vehicle 100. The vehicle 100 is a battery-electric vehicle or a hybrid vehicle.

The invention claimed is:

1. A stator for an electrical machine, having a stator core, in which are formed a multiplicity of grooves that are distributed along a circumferential direction, and which has two end sides that are mutually opposite in an axial direction, and a stator winding that has a multiplicity of shaped conductors, wherein the shaped conductors have in each case one first leg portion, one second leg portion and one head portion which connects the leg portions in an electrically conductive manner on one of the end sides; wherein the leg portions of a respective shaped conductor extend through different grooves and are spaced apart from one another by an increment of a number of grooves; wherein the head portion has an inner portion which extends in the circumferential direction and adjoins the first leg portion, and an outer portion which extends in the circumferential direction, adjoins the second leg portion and is disposed radially further outward than the inner portion; wherein the increment in a first and a second of the shaped conductors is S, in a third of the shaped conductors is at least one greater than S, and in a fourth of the shaped conductors is at least one smaller than S, where S is a natural number, wherein in that the head portion furthermore has an offset portion which connects the inner portion to the outer portion and has a greater radial extent than the inner portion and the outer portion; and in that the outer portion of the head portion of the third shaped conductor runs at least partially radially further outward than the outer portions of the head portions of the first, the second and the fourth shaped conductor.

2. The stator as claimed in claim 1, wherein the outer portion of the head portion of the fourth shaped conductor runs at least partially radially further outward than the outer portion of the head portion of the first shaped conductor.

3. The stator as claimed in claim 2, wherein each groove is divided radially at least into first to fourth layers, which are sequenced in the order of their designation, for receiving one of the leg portions of one of the shaped conductors, the first leg portion being disposed in the first or the second layer and/or the second leg portion being disposed in the third or the fourth layer.

4. The stator as claimed in claim 2, wherein the first leg portions of the first and the third shaped conductor are disposed in the same groove, and the first leg portions of the second and the fourth shaped conductor are disposed in the same groove; and/or the second leg portions of the first and the fourth shaped conductor are disposed in the same groove, and the second leg portions of the second and the third shaped conductor are disposed in the same groove.

5. The stator as claimed in claim 2, wherein in fifth, sixth, seventh and eighth ones of the shaped conductors the increment is S;

the first leg portions of the fifth and the sixth shaped conductor being disposed in the same groove, and the groove being adjacent to the groove in which the first leg portions of the first and the third shaped conductor are disposed;

the first leg portions of the seventh and the eighth shaped conductor being disposed in the same groove, and the groove being adjacent to the groove in which the first leg portions of the second and the fourth shaped conductor are disposed;

the head portions of the first to fourth shaped conductors being disposed between the head portions of the fifth and the sixth shaped conductor and the head portions of the seventh and the eighth shaped conductor.

6. The stator as claimed in claim 2, wherein the outer portion of the head portion of the second shaped conductor at least partially covers the outer portion of the head portion of the fourth shaped conductor with respect to the end side.

7. The stator as claimed in claim 2, wherein the outer portion of the head portion of the third shaped conductor runs at least partially axially further away from the stator core than the outer portion of the head portion of the fourth shaped conductor and/or than the outer portion of the head portion of the first shaped conductor.

8. The stator as claimed in claim 1, wherein each groove is divided radially at least into first to fourth layers, which are sequenced in the order of their designation, for receiving one of the leg portions of one of the shaped conductors, the first leg portion being disposed in the first or the second layer and/or the second leg portion being disposed in the third or the fourth layer.

9. The stator as claimed in claim 1, wherein the first leg portions of the first and the third shaped conductor are disposed in the same groove, and the first leg portions of the second and the fourth shaped conductor are disposed in the same groove; and/or the second leg portions of the first and the fourth shaped conductor are disposed in the same groove, and the second leg portions of the second and the third shaped conductor are disposed in the same groove.

10. The stator as claimed in claim 9, wherein the groove in which the first leg portions of the first and the third shaped conductor are disposed, and the groove in which the first leg portions of the second and the fourth shaped conductor are disposed, are directly adjacent; and/or the groove in which the second leg portions of the first and the fourth shaped conductor are disposed, and the groove in which the second leg portions of the second and the third shaped conductor are disposed, are directly adjacent.

11. The stator as claimed in claim 1, wherein in fifth, sixth, seventh and eighth ones of the shaped conductors the increment is S;

the first leg portions of the fifth and the sixth shaped conductor being disposed in the same groove, and the groove being adjacent to the groove in which the first leg portions of the first and the third shaped conductor are disposed;

the first leg portions of the seventh and the eighth shaped conductor being disposed in the same groove, and the groove being adjacent to the groove in which the first leg portions of the second and the fourth shaped conductor are disposed;

the head portions of the first to fourth shaped conductors being disposed between the head portions of the fifth and the sixth shaped conductor and the head portions of the seventh and the eighth shaped conductor.

12. The stator as claimed in claim 11, wherein the circumferential extent of the offset portions of the fifth to eighth shaped conductors, is chosen, in particular as a function of a material thickness of the shaped conductors and/or of their bending radii, to be so minor that the outer portion of the head portion of the seventh shaped conductor axially covers the outer portion of the head portion of the third shaped conductor.

13. The stator as claimed in claim 11, wherein the outer portion of the head portion of the third shaped conductor runs at least in portions further radially outward than the outer portion of the head portion of the fifth shaped conductor and/or than the outer portion of the head portion of the seventh shaped conductor.

14. The stator as claimed in claim 1, wherein the outer portion of the head portion of the second shaped conductor at least partially covers the outer portion of the head portion of the fourth shaped conductor with respect to the end side.

15. The stator as claimed in claim 1, wherein the outer portion of the head portion of the third shaped conductor runs at least partially axially further away from the stator core than the outer portion of the head portion of the fourth shaped conductor and/or than the outer portion of the head portion of the first shaped conductor.

16. The stator as claimed in claim 1, wherein the offset portions of the head portions of the first, the third and the fourth shaped conductor run side by side along an angular region of the circumferential direction that occupies at least half of an angular region of the circumferential direction occupied by the offset portion of the head portion of the first shaped conductor.

17. The stator as claimed in claim 1, wherein the outer portion of the head portion of the second shaped conductor runs at least partially radially further inward than the outer portion of the head portion of the fourth shaped conductor; and/or the outer portion of the head portion of the second shaped conductor at least partially covers the outer portion of the head portion of the first shaped conductor with respect to the end side.

18. The stator as claimed in claim 1, wherein the shaped conductors form a plurality of strands of the stator winding, wherein the first to fourth shaped conductors belong to the same strand.

19. The stator as claimed in claim 18, wherein the shaped conductors for each strand form a first current path and a second current path which is connected in parallel or in series to the first current path, wherein the first to fourth shaped conductors form a shaped conductor assembly in which the third shaped conductor and the fourth shaped conductor are wired in the first current path, and the first shaped conductor and the second shaped conductor are wired in the second current path, wherein provided is a further corresponding shaped conductor assembly in which the third shaped conductor and the fourth shaped conductor are wired in the second current path, and the first shaped conductor and the second shaped conductor are wired in the first current path.

20. An electrical machine comprising a stator as claimed in claim 1; and a rotor which is rotatably mounted within the stator; wherein the electrical machine is specified to drive a vehicle.

* * * * *